United States Patent
Hendrey

(10) Patent No.: US 10,223,826 B2
(45) Date of Patent: *Mar. 5, 2019

(54) PIP INDEXING TECHNIQUE TO CLIP POLYGONS IN A CLIPPING REGION

(71) Applicant: SPLUNK INC., San Francisco, CA (US)

(72) Inventor: Geoffrey R. Hendrey, San Francisco, CA (US)

(73) Assignee: SPLUNK INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/799,569

(22) Filed: Oct. 31, 2017

(65) Prior Publication Data

US 2018/0053342 A1    Feb. 22, 2018

Related U.S. Application Data

(63) Continuation of application No. 14/815,022, filed on Jul. 31, 2015, now Pat. No. 9,836,874, which is a continuation-in-part of application No. 14/700,685, filed on Apr. 30, 2015, now Pat. No. 9,607,414, which is a continuation-in-part of application No.
(Continued)

(51) Int. Cl.
  *G06T 15/00*   (2011.01)
  *G06T 15/06*   (2011.01)
  *G06T 15/20*   (2011.01)
  *G06T 15/30*   (2011.01)

(52) U.S. Cl.
  CPC .................. *G06T 15/30* (2013.01)

(58) Field of Classification Search
  None
  See application file for complete search history.

(56) References Cited

U.S. PATENT DOCUMENTS 5,454,068 A    9/1995 Ramanujam
5,668,940 A    9/1997 Steiner et al.
(Continued)

OTHER PUBLICATIONS

Reshetov et al., Multi-Level Ray Tracing Algorithm, Jul. 31, 2005, pp. 1176-1185.
(Continued)

*Primary Examiner* — Martin Mushambo
(74) *Attorney, Agent, or Firm* — Shook, Hardy & Bacon, L.L.P.

(57) ABSTRACT

A system that displays a set of polygons is described. This system obtains a set of line segments that defines the set of polygons. The system forms a horizontal index that keeps track of where line segments vertically project onto a horizontal reference line and similarly forms a vertical index for horizontal projections onto a vertical reference line. The system obtains a clip rectangle that defines a view into the set of polygons and uses the horizontal and vertical indexes to determine intersections between borders of the clip rectangle and line segments in the set of line segments. Next, the system uses the determined intersections to clip polygons in the set of polygons that intersect the clip rectangle. Finally, the system transfers the clipped polygons, and also unclipped polygons that fit completely within the clip rectangle, to a display device that displays the view into the set of polygons.

30 Claims, 21 Drawing Sheets

Related U.S. Application Data

14/606,387, filed on Jan. 27, 2015, now Pat. No. 9,767,122.

(56) References Cited

U.S. PATENT DOCUMENTS

| | | | |
|---|---|---|---|
| 5,818,460 A | 10/1998 | Covey et al. | |
| 6,172,680 B1 | 1/2001 | Wong et al. | |
| 6,172,682 B1 | 1/2001 | Claiborne et al. | |
| 6,215,501 B1 | 4/2001 | Takita | |
| 6,363,392 B1 | 3/2002 | Halstead et al. | |
| 7,287,002 B1 | 10/2007 | Asher et al. | |
| 7,952,583 B2 | 5/2011 | Waechter et al. | |
| 8,072,452 B1 | 12/2011 | Brown | |
| 8,243,070 B1 | 8/2012 | Brown | |
| 8,379,025 B1 | 2/2013 | Carr et al. | |
| 8,416,122 B1 | 4/2013 | Pedersen | |
| 8,515,963 B1 | 8/2013 | Blank, Jr. et al. | |
| 9,002,854 B2 | 4/2015 | Baum et al. | |
| 9,082,189 B2 | 7/2015 | Look et al. | |
| 9,607,414 B2 | 3/2017 | Hendrey | |
| 9,767,122 B2 | 9/2017 | Hendrey | |
| 9,842,432 B2 | 12/2017 | Hendrey | |
| 10,055,886 B2 | 8/2018 | Hendrey | |
| 2002/0180751 A1 | 12/2002 | Rozzi | |
| 2002/0188581 A1 | 12/2002 | Fortin et al. | |
| 2003/0074471 A1 | 4/2003 | Anderson et al. | |
| 2005/0078326 A1 | 4/2005 | Stokes et al. | |
| 2005/0140694 A1 | 6/2005 | Subramanian et al. | |
| 2005/0257204 A1 | 11/2005 | Bryant et al. | |
| 2006/0176297 A1 | 8/2006 | Kim et al. | |
| 2006/0197763 A1 | 9/2006 | Harrison et al. | |
| 2007/0126739 A1 | 6/2007 | Cartier | |
| 2007/0139440 A1* | 6/2007 | Crow | G06T 11/001 345/614 |
| 2007/0236498 A1 | 10/2007 | Higuchi et al. | |
| 2008/0143735 A1 | 6/2008 | Besley et al. | |
| 2009/0027415 A1 | 1/2009 | Dispoto et al. | |
| 2009/0051706 A1 | 2/2009 | Fleming | |
| 2010/0091016 A1 | 4/2010 | Kazar et al. | |
| 2010/0111370 A1 | 5/2010 | Black et al. | |
| 2010/0217480 A1 | 8/2010 | Link, II | |
| 2011/0122130 A1 | 5/2011 | Vesely et al. | |
| 2011/0295564 A1 | 12/2011 | Chazal et al. | |
| 2011/0320319 A1* | 12/2011 | Streich | G06Q 30/06 705/27.1 |
| 2012/0054195 A1 | 3/2012 | Hu et al. | |
| 2012/0256915 A1 | 10/2012 | Jenkins | |
| 2012/0274984 A1 | 11/2012 | Wang et al. | |
| 2012/0274985 A1 | 11/2012 | Bernal et al. | |
| 2013/0019314 A1 | 1/2013 | Ji et al. | |
| 2013/0076732 A1 | 3/2013 | Cervelli et al. | |
| 2013/0085847 A1 | 4/2013 | Dyor et al. | |
| 2013/0120391 A1 | 5/2013 | Brown | |
| 2013/0163053 A1 | 6/2013 | Wang et al. | |
| 2013/0218873 A1 | 8/2013 | Lassley et al. | |
| 2013/0328882 A1 | 12/2013 | Pirwani et al. | |
| 2014/0043330 A1 | 2/2014 | Ceylan et al. | |
| 2014/0043342 A1 | 2/2014 | Goel et al. | |
| 2014/0236889 A1 | 8/2014 | Vasan et al. | |
| 2014/0282560 A1 | 9/2014 | Hutton et al. | |
| 2015/0077276 A1 | 3/2015 | Mitchell et al. | |
| 2015/0081212 A1 | 3/2015 | Mitchell et al. | |
| 2015/0269250 A1 | 9/2015 | Basovnik et al. | |
| 2015/0310636 A1 | 10/2015 | Yoo et al. | |
| 2015/0332505 A1 | 11/2015 | Wang et al. | |
| 2016/0088546 A1 | 3/2016 | Birch et al. | |

OTHER PUBLICATIONS

Splunk, "Hunk: Splunk Analytics for Hadoop Intro—Part 2", Jul. 7, 2013, 6 pages.

Final Office Action dated Dec. 4, 2017 in U.S. Appl. No. 14/606,396, 15 pages.

* cited by examiner

```
Original Search: 501
search "error | stats count BY host

Sent to peers: 502
search "error | prestats count BY host (map)

Executed by search head: 503
Merge prestats results received from peers (reduce)
```

FIG. 5

| Data Summary | | | |
|---|---|---|---|
| Hosts (5) | Sources (8) | Sourcetypes (3) | |
| Host | | Count | Last Update |
| mailsv | | 9,829 | 4/29/14 1:32:47.000 PM |
| vendor_sales | | 30,244 | 4/29/14 1:32:46.000 PM |
| www1 | | 24,221 | 4/29/14 1:32:44.000 PM |
| www2 | | 22,595 | 4/29/14 1:32:47.000 PM |
| www3 | | 22,975 | 4/29/14 1:32:46.000 PM |

FIG. 6B

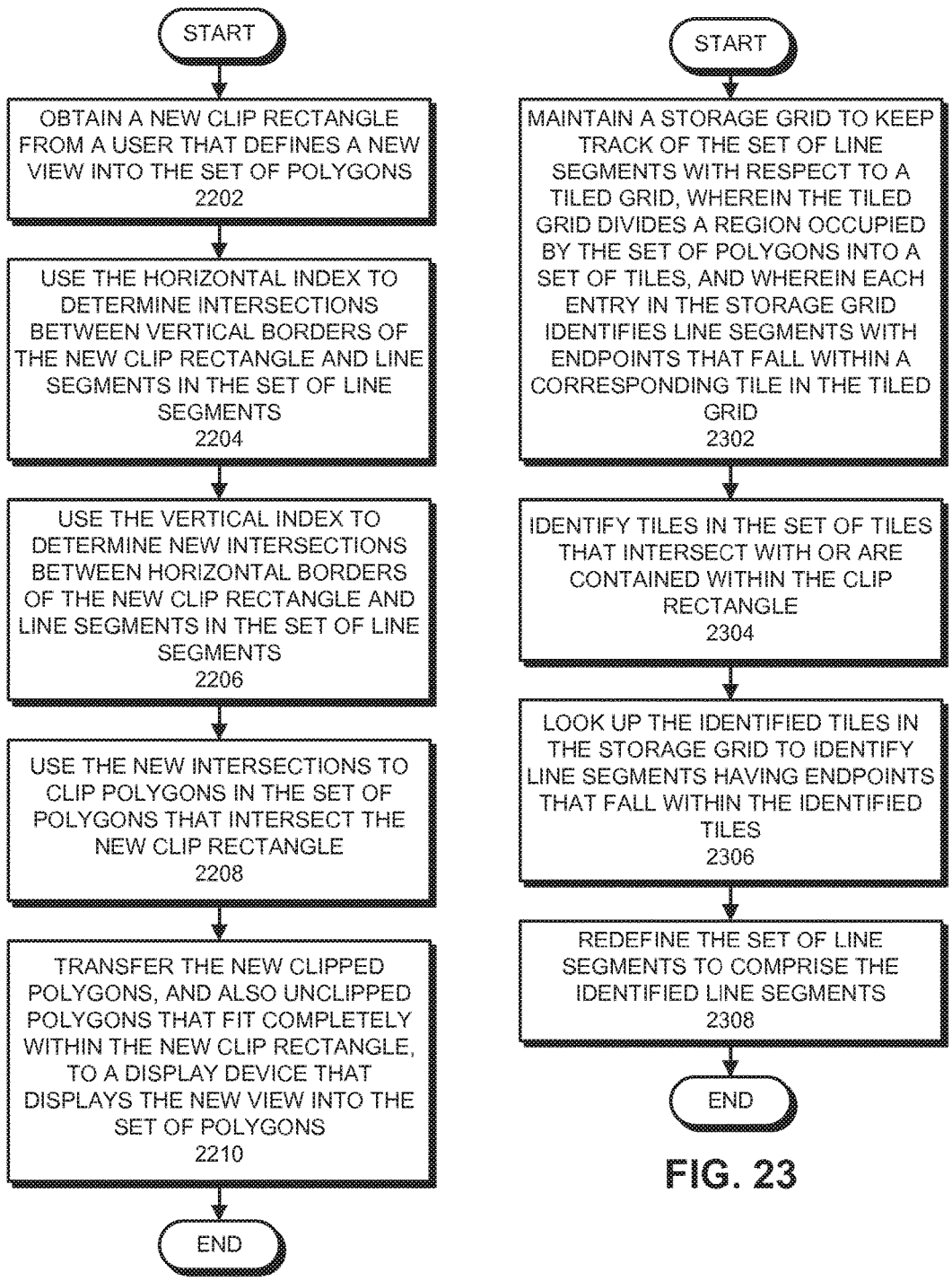

PIP INDEXING TECHNIQUE TO CLIP POLYGONS IN A CLIPPING REGION

RELATED APPLICATIONS

This application is a continuation application of, and hereby claims priority under 35 U.S.C. § 120 to, pending U.S. application Ser. No. 14/815,022, entitled "Efficient Polygon-Clipping Technique to Reduce Data Transfer Requirements for a Viewport," by inventor Geoffrey R. Hendrey, filed on Jul. 31, 2015. U.S. application Ser. No. 14/815,022 is a continuation-in-part of U.S. Pat. No. 9,607,414, filed Apr. 30, 2015, which is itself a continuation-in-part of U.S. Pat. No. 9,767,122, filed Jan. 27, 2015. The entire contents of each of the above-listed applications is hereby incorporated by reference for all purposes as if fully set forth herein.

BACKGROUND

1. Field of the Invention

The disclosed embodiments generally relate to techniques for displaying polygons. More specifically, the disclosed embodiments relate to an efficient polygon-clipping technique that facilitates clipping polygons to reduce the data that needs to be processed to display a set of polygons within a moveable viewport.

2. Related Art

Many applications may require clipping of polygons that have large point counts. An example is a web-based choropleth map in which the user "drags" the map. This has the effect of repositioning a clip rectangle defined by the screen's viewport. When the user releases the drag event, the server responds by sending a portion of the geometry that is clipped out of the entire map geometry to fit just the viewport. This reduces the amount of data that must be transferred. Used in conjunction with a generalization technique such as the Ramer-Douglas-Peucker technique, the map can be viewed in sufficient detail for any desired clip.

One popular polygon-clipping technique is the Greiner-Hormann technique (GH). The GH polygon-clipping technique begins by finding all the points at which two polygons intersect. Given n vertices for the subject polygon and m vertices for the clip polygon, the step of finding the intersections requires $O(m*n)$ time. This means that using the GH polygon-clipping technique can be time-consuming for choropleth maps that have large point counts, which can cause the clipping operation to introduce a noticeable lag when a user drags a choropleth map.

Hence, what is needed is an efficient polygon-clipping technique to facilitate re-positioning a screen's viewport.

SUMMARY

The disclosed embodiments relate to a system, a method and instructions embodied on a non-transitory computer-readable storage medium that display a set of polygons. During operation, the system obtains a set of line segments that defines the set of polygons. Next, the system forms a horizontal index that keeps track of where line segments in the set of line segments vertically project onto a horizontal reference line. The system also forms a vertical index that keeps track of where line segments in the set of line segments horizontally project onto a vertical reference line. The system then obtains a clip rectangle that defines a view into the set of polygons. Next, the system uses the horizontal index to determine intersections between vertical borders of the clip rectangle and the line segments, and also uses the vertical index to determine intersections between horizontal borders of the clip rectangle and the line segments. The system then uses the determined intersections to clip polygons that intersect the clip rectangle. Finally, the system transfers the clipped polygons, and also unclipped polygons that fit completely within the clip rectangle, to a display device that displays the view into the set of polygons.

In some embodiments, the system subsequently obtains a new clip rectangle from a user that defines a new view into the set of polygons. The system then uses the horizontal and vertical indexes to determine intersections between the new clip rectangle and the line segments. Next, the system uses the new intersections to clip polygons that intersect the new clip rectangle. Then, the system transfers the new clipped polygons, and also unclipped polygons that fit completely within the new clip rectangle, to a display device that displays the new view into the set of polygons.

In some embodiments, the system maintains a storage grid to keep track of the line segments with respect to a tiled grid, wherein the tiled grid divides a region occupied by the polygons into a set of tiles, and wherein each entry in the storage grid identifies line segments with endpoints that fall within a corresponding tile in the tiled grid. Then, prior to determining the intersections, the system winnows the set of line segments by: (1) identifying tiles in the set of tiles that intersect with or are contained within the clip rectangle; (2) looking up the identified tiles in the storage grid to identify line segments having endpoints that fall within the identified tiles; and (3) redefining the set of line segments to comprise the identified line segments.

In some embodiments, while using the determined intersections to clip the polygons, the system performs as follows: for each polygon intersected by the clip rectangle, the system maintains a polygon list including vertices of the polygon, and also maintains a clip rectangle list including vertices of the clip rectangle. Next, the system inserts polygon-specific intersections between the polygon and the clip rectangle, obtained from the determined intersections, into both the polygon list and the clip rectangle list, and also maintains a bidirectional neighbor link between each instance of an intersection in the polygon list and a corresponding instance of the same intersection in the clip rectangle list. Then, the system sorts the intersections and the vertices in the polygon list in either clockwise or counter-clockwise order and also sorts the intersections and the vertices in the clip rectangle list in either clockwise or counter-clockwise order. The system then marks each intersection as an entry or an exit from the polygon by using a point-in-polygon test to determine whether an initial vertex in the clip rectangle list is inside or outside the clip rectangle, and then while traversing the clip rectangle list, marks intersections alternately as an entry or an exit. Finally, the system generates one or more clipped polygons by emitting vertices starting at an intersection in the polygon list and navigating back and forth between the polygon list and the clip rectangle list as intersections are encountered, and proceeding backward or forward in the polygon list or the clip rectangle list based upon whether the intersection is an entry or an exit.

In some embodiments, the set of polygons defines regions of a choropleth map wherein each region is shaded, patterned or colored in proportion to a number of data points that fall into the region.

BRIEF DESCRIPTION OF THE DRAWINGS

FIG. 5 illustrates an exemplary search query received from a client and executed by search peers in accordance with the disclosed embodiments.

FIG. 6B illustrates a data summary dialog that enables a user to select various data sources in accordance with the disclosed embodiments.

FIG. 22 presents a flow chart illustrating the process of displaying a view for a new clip rectangle in accordance with the disclosed embodiments.

FIG. 23 presents a flow chart illustrating how a tiled grid can be used to reduce the number of segments that need to be analyzed in accordance with the disclosed embodiments.

DETAILED DESCRIPTION

Figure 1:
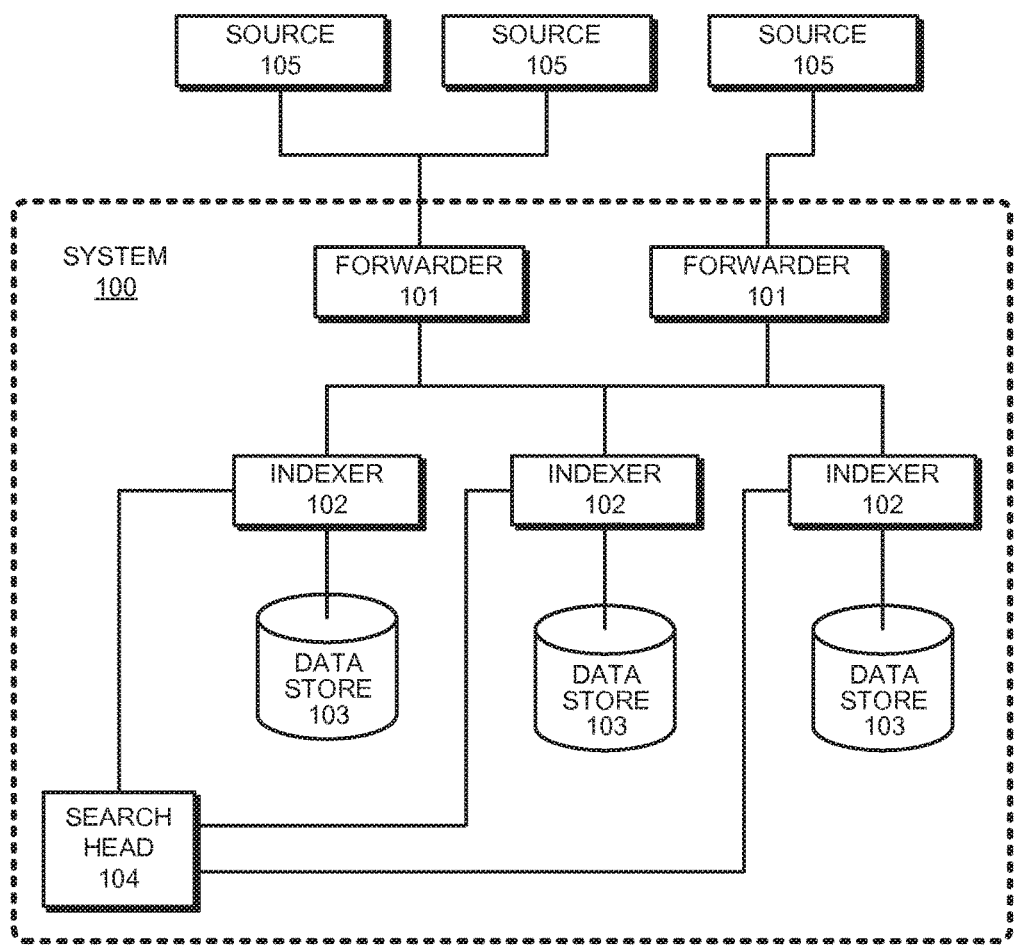
FIG. 1 presents a block diagram of an event-processing system in accordance with the disclosed embodiments.

Table 1 illustrates sorted point structures in accordance with the disclosed embodiments.

Table 2 illustrates sorted point structures with corresponding lists of open segments in accordance with the disclosed embodiments.

Table 3 illustrates how non-final rows can be struck out in accordance with the disclosed embodiments.

Table 4 illustrates y-ranges and corresponding open segments in accordance with the disclosed embodiments.

Table 5 illustrates how non-final rows can be struck out in accordance with the disclosed embodiments.

Table 6 illustrates how the data structure can be modified for modulo 3 storage in accordance with the disclosed embodiments.

DETAILED DESCRIPTION

The disclosed embodiments relate to a system, a method and instructions embodied on a non-transitory computer-readable storage medium code that facilitate displaying a set of polygons in a viewport. (Note that throughout this specification and the attached claims we refer to "the system," "the method" and "the instructions embodied on a non-transitory computer-readable storage medium" collectively as "the system.") We describe a solution to the point-in-polygon (PIP) problem, before we finally describe a technique for clipping a set of polygons for a view port.

1.1 System Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that was selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTER- PRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
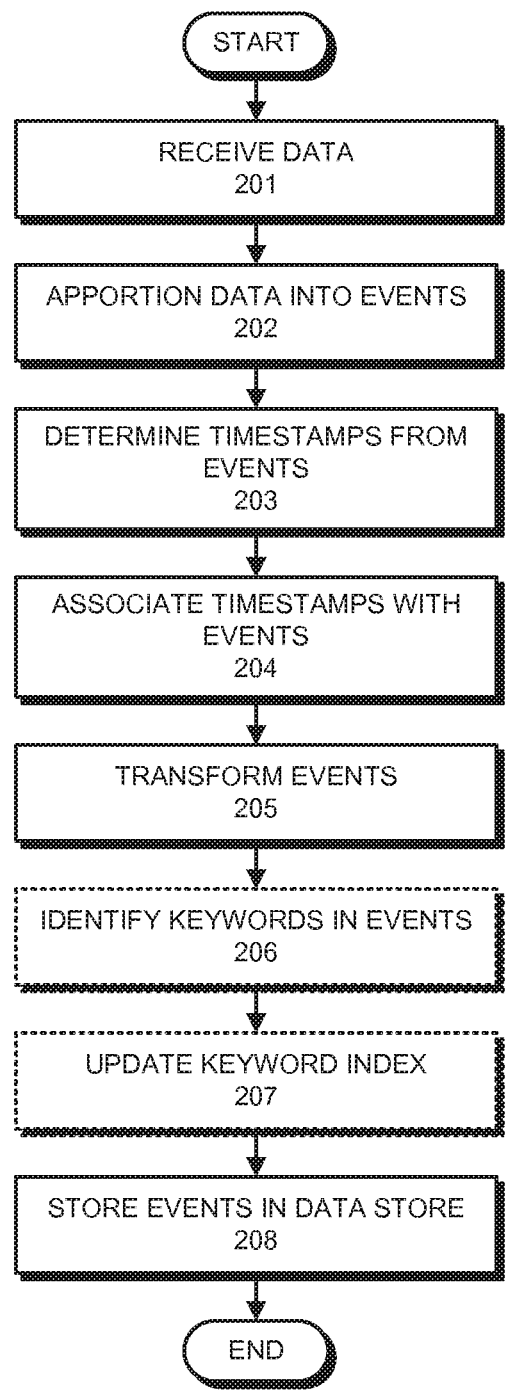
FIG. 2 presents a flow chart illustrating how indexers process, index, and store data received from forwarders in accordance with the disclosed embodiments.

FIG. 2 presents a flow chart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

1.4 Query Processing

Figure 3:
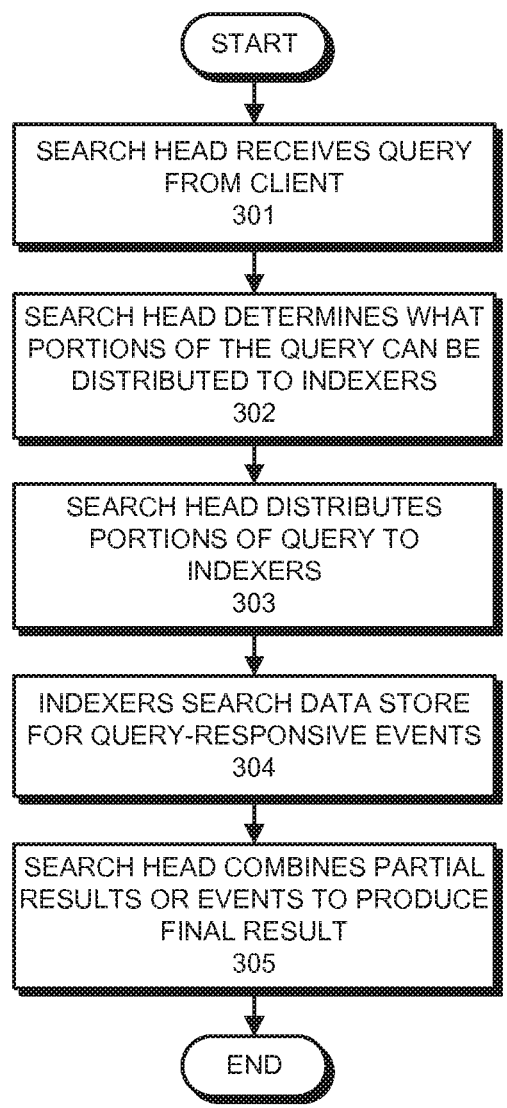
FIG. 3 presents a flow chart illustrating how a search head and indexers perform a search query in accordance with the disclosed embodiments.

FIG. 3 presents a flow chart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
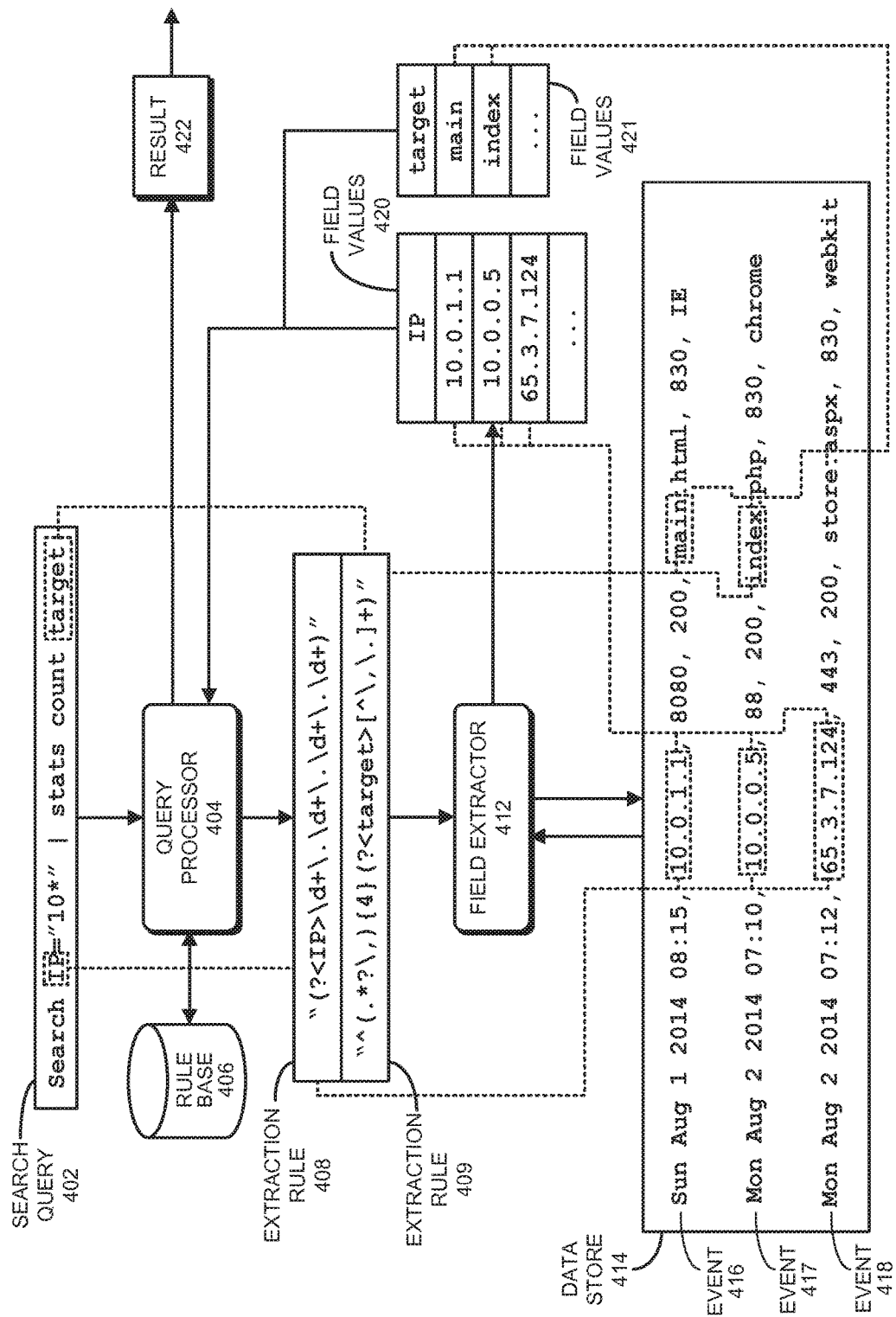
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in the Search Processing Language (SPL), which is used in conjunction with the SPLUNK® ENTERPRISE system. SPL is a pipelined search language in which a set of inputs is operated on by a first command in a command line, and then a subsequent command following the pipe symbol "I" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that has been filtered based on some criteria.

Next, field extractor 412 applies extraction rule 408 for the first command Search IP="10*" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events;

a subset of the values; statistics calculated based on the values; a report containing the values; or a visualization, such as a graph or chart, generated from the values.

1.6 Exemplary Search Screen

Figure 6A:
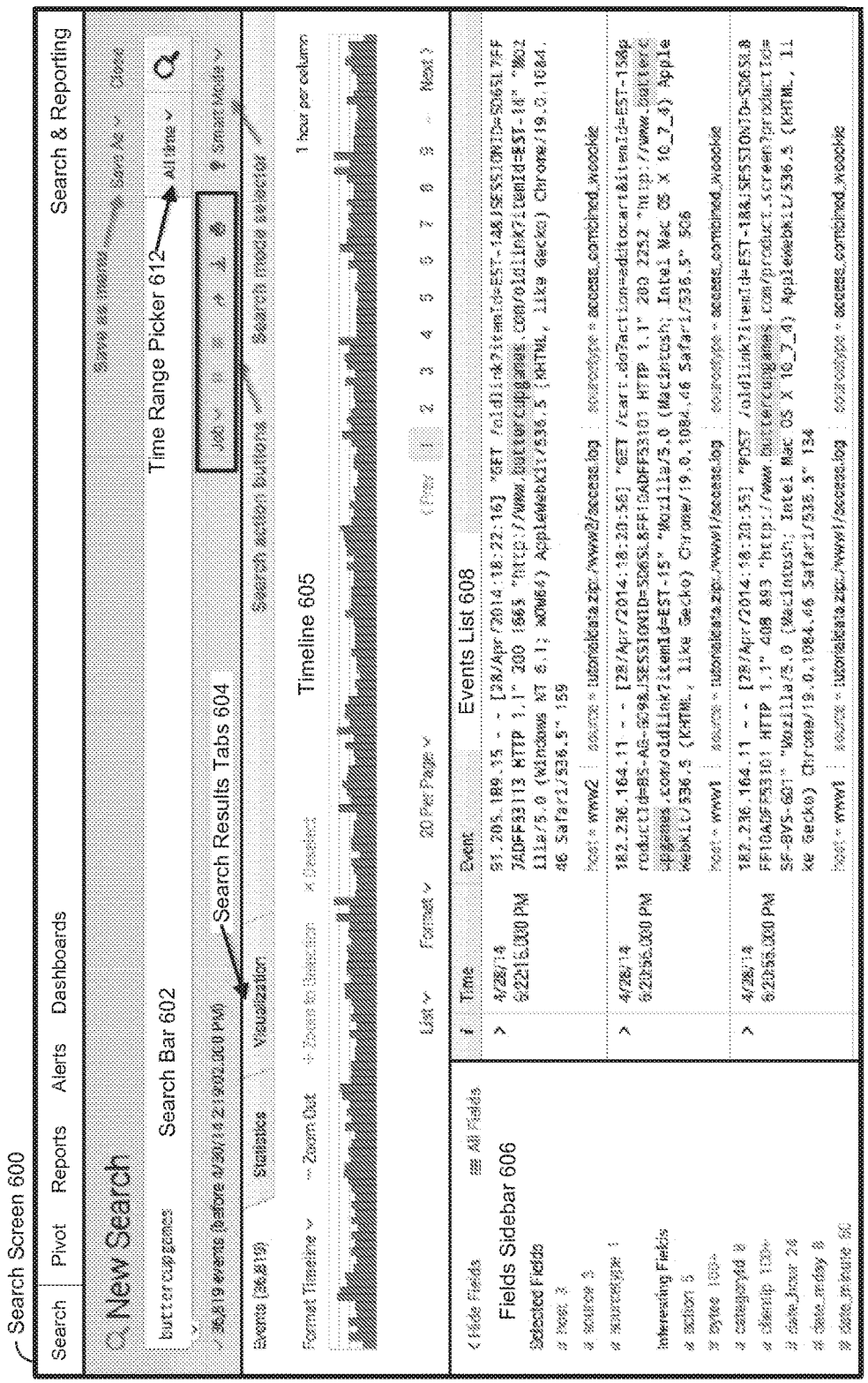
FIG. 6A illustrates a search screen in accordance with the disclosed embodiments.

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indexes to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

System for Processing and Displaying Geographic Data

Figure 7:
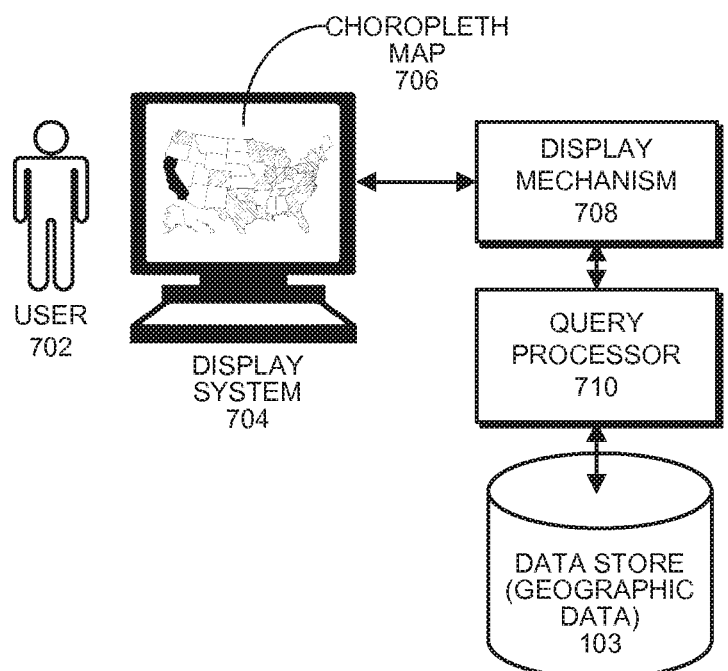
FIG. 7 illustrates a system for processing and displaying geographic data in accordance with the disclosed embodiments.

FIG. 7 illustrates a system for processing and displaying geographic data in accordance with the disclosed embodiments. This system includes a data store 103 containing geographic data, such as population statistics associated with geographic regions. It also includes a query processor 710 configured to execute queries involving geographic data. Results generated by query processor 710 can be formatted using display mechanism 708 and then displayed to a user 702 through a display system 704. For example, as illustrated in FIG. 7, the results can be displayed using a choropleth map 706, wherein each geographic region is shaded, patterned or colored in proportion to a number of data points that fall into the geographic region. The process of generating a choropleth map (or some other representation of geographic data) is described in more detail below.

Fast Point-in-Polygon Indexing

Figure 8:
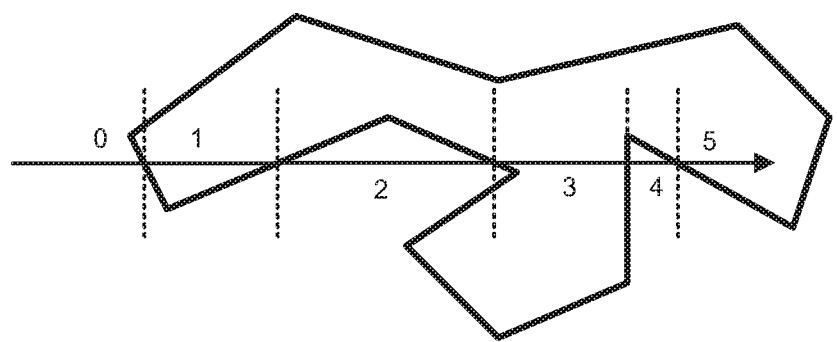
FIG. 8 illustrates a ray being cast across a polygon with crossing number (CN) counts in accordance with the disclosed embodiments.

To generate a choropleth map, we first determine which data points fall into each geographic region. This can be accomplished by using a technique that solves the point-in-polygon (PIP) problem. The PIP problem is typically solved using either the known crossing number (CN) technique or the known winding number (WN) technique. For example, the CN technique is depicted in FIG. 8 for a single polygon and single point located at the end of the arrow labeled "5". A ray is cast from the exterior of the polygon to the point being tested and the counter is incremented for each edge that is crossed. Although in FIG. 8 the counter is shown as being incremented in the order in which the ray intersects the polygon's boundary segments, there is no requirement that the segments be tested in any particular order. Typically, the line segments are iterated either clockwise or anti-clockwise from an arbitrary "starting point" in the polygon boundary. The CN technique declares a point to be inside the polygon if the total crossing count is odd. Intuitively this makes sense, because crossing into a boundary from the exterior places the ray inside the shape, and the ray can only exit the shape by crossing the boundary again, thus flipping the count from odd to even. Note that the ray may be cast in any direction; the choice of a horizontal ray in FIG. 8 is arbitrary. Furthermore, it does not matter whether the ray is cast from the point to infinity in any direction, or from infinity to the point. The crossing count will be the same regardless of whether the ray is cast inward or outward.

Because this disclosure focuses on accelerating the CN technique, and because the CN technique has the same computational complexity as the WN technique, we will not describe the WN technique further other than to say that it iterates the vertices of the polygon and counts the number of full turns around the point being tested.

There are a number of existing approaches to accelerating PIP testing. Perhaps the most common is to insert the polygons into a spatial data structure such as an R-Tree. One example of this is the PostGIS™ database. The R-Tree can be queried to retrieve a set of candidate polygons based on rectangular bounding boxes surrounding each polygon. This eliminates polygons whose bounding boxes do not surround the point in question. Each surviving candidate must then be tested using either CN or WN to determine if the point in question falls inside, outside or on the edge of the candidate. Because candidates may contain large numbers of vertices, and because there may exist many candidates, the CN and WN techniques are still the bottleneck because they are both O(n) where n is the number of vertices in the polygon being tested. More recently, an approach has been proposed that builds an index specifically for PIP testing; however, this approach suffers from an exponential index build complexity of $O(n^{2.6})$. Both the R-Tree and the above-described index-building approach rely on in-memory tree structures. The performance of these in-memory tree structures when stored on spinning disk media as opposed to RAM depends on the depth of the tree because each link traversal in a tree search requires a seek operation and seek operations are slow on traditional spinning media.

The new indexing technique described in this disclosure involves casting horizontal rays from polygon segments onto a reference line and then storing the set of segments intersected by the rays. For a given point to be PIP tested, the set of intersected segments across all polygons in the index can then be retrieved from the index and fed directly to the CN technique. This obviates the need to iterate the boundaries of the polygons to determine which segments intersect a ray emanating from the point to be tested.

Figure 9:
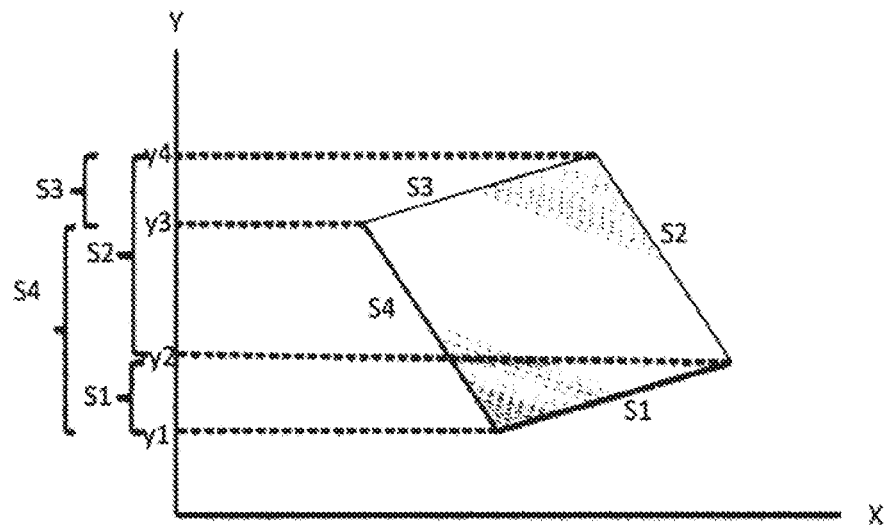
FIG. 9 illustrates polygon segments projected onto a y-axis in accordance with the disclosed embodiments.

FIG. 9 shows a polygon labeled "A" and the projection of line segments S1 through S4 onto the y-axis. Note that segment projections overlap on the y-axis and the set of overlapping segments is constant over any continuous range of y-values bounded by the projection of 2 successive points on the y-axis. For instance, referring to FIG. 9, for the continuous range of y-values [y2, y3), a horizontal ray fixed at any y-value in the range will intersect the set of segments [S2, S4]. Therefore, an indexing mechanism can be designed such that for a given point to be PIP tested, the y-coordinate of the point is used to look up a corresponding set of intersected segments based upon which of a finite set of g-ranges the point's y-value falls inside.

TABLE 1

{S1, --, y1, O)
{S4, --, y1, O}
{S1, --, y2, C}
{S2, --, y2, O}
{S3, --, y3, O}
{S4, --, y3, C}
{S2, --, y4, C}
{S3, --, y4, C}

We now describe how to build such an index that comprises sorted y-ranges, and their corresponding set of intersected segments. Consider a point data structure for describing the points as {segmentId, x, y, order}. The "order" field can assume the values O or C for "opening" or "closing". An "opening" point for a segment corresponds to the point with the smaller y-coordinate. A "closing" point is the segment's point with the larger y-coordinate. For example, the coordinate of S1 with the smaller y-value would be {S1, --, y1, O} (the x-values are shown as "--"). By sorting the point structures based on their y-value from smallest to largest, we obtain the ordering with ascending y-values illustrated in Table 1.

By traversing this sorted set of point data structures from beginning to end, we can create a corresponding list of open segments (that is to say, segments that would intersect a horizontal ray projected from point x,y). As we traverse the listed point structures shown in Table 1, we can perform the following operation: if the order field is "O", then we add the corresponding segment ID to the list of open segments. If the order field is "C", then we remove the corresponding segment ID from the list. Hereafter, we call this the "opening and closing technique." Following this simple procedure, the list of open segments is shown next to each point data structure as is illustrated in Table 2 below.

For the list shown in Table 2, the final list for a given y-value provides the set of open segments between the current y-value and the next y-value. Table 3 illustrates this by striking out the non-final segments.

TABLE 2

{S1, --, y1, O}: [Sl]
{S4, --, y1, O}: [Sl, S4]
{S1, --, y2, C}: [S4]
{S2, --, y2, O}: [S2, S4]
{S3, --, y3, O}: [S2, S3, S4]
{S4, --, y3, C}: [S2, S3]
{S2, --, y4, C}: [S3]
{S3, --, y4, C}: [ ]

From the remaining adjacent y-values (those not struck out), we can extract the y-coordinates, and the open lists to create continuous y-ranges, and corresponding lists of open segments, as shown in Table 4, including the ranges from negativity infinity, and to positive infinity on the y-axis.

TABLE 3

~~{S1, --, y1, O}: [S1]~~
{S4, --, y1, O}: [S1, S4]
~~{S1, --, y2, C}: [S4]~~
{S2, --, y2, O}: [S2, S4]
~~{S3, --, y3, O}: [S2, S3, S4]~~
{S4, --, y3, C}: [S2, S3]
~~{S2, --, y4, C}: [S3]~~
{S3, --, y4, C}: [ ]

TABLE 4

[ -INF, y1): [ ]
[y1, y2): [S1, S4]
[y2, y3): [S2, S4]
[y3, y4): [S2, S3]
[y4, INF): [ ]

Figure 10:
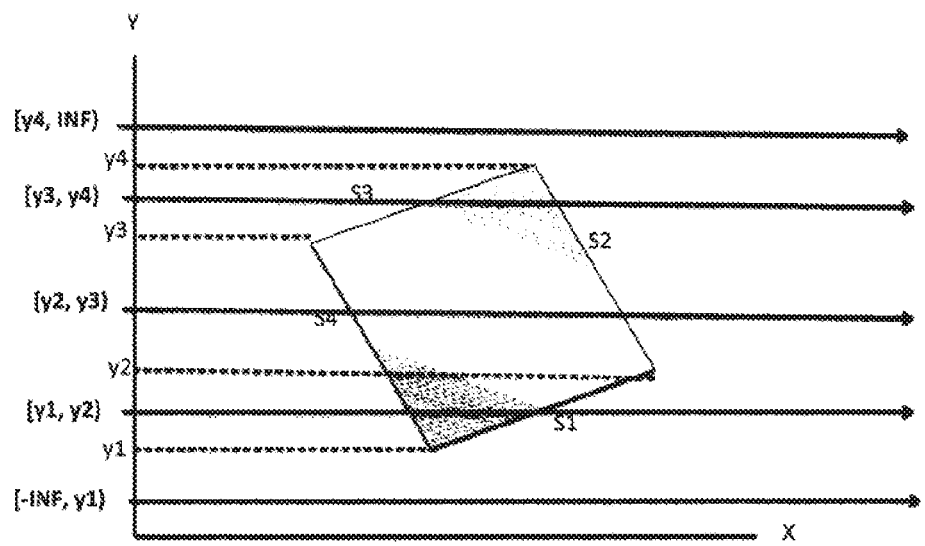
FIG. 10 illustrates horizontal rays cast in each y-range in accordance with the disclosed embodiments.

FIG. 10 illustrates each of the 5 ranges, and a horizontal ray cast through each range. One can easily validate from the image in FIG. 10 that the list of open segments for each range, as shown in Table 4, accurately describes the set of segments intersected by a given ray. For example, the ray in range [y3, y4) intersects S2 and S3. For each range of y-values, we have computed the set of intersections of a horizontal ray. Therefore, the list of open segments is actually a set of ray intersections for any ray in the given range.

TABLE 5

~~{S1A, --, y1, O}: [S1A]~~
{S2A, --, y1, O}: [S1A, S2A]
~~{S3A, --, y2, O}: [S1A, S2A, S3A]~~
{S1A, --, y2, C}: [S2A, S3A]
~~{S1B, --, y3, O}: [S2A, S3A, S1B]~~
{S3B, --, y3, O}: [S2A, S3A, S1B, S3B]
~~{S2B, --, y4, O}: [S2A, S3A, S1B, S3B, S2B]~~
{S1B, --, y4, C}: [S2A, S3A, S3B, S2B]
~~{S2B, --, y5, C}: [S2A, S3A, S3B]~~
{S3B, --, y5, C}: [S2A, S3A]
~~{S2A, --, y6, C}: [S3A]~~
{S3A, --, y6, C}: [ ]

Figure 11:
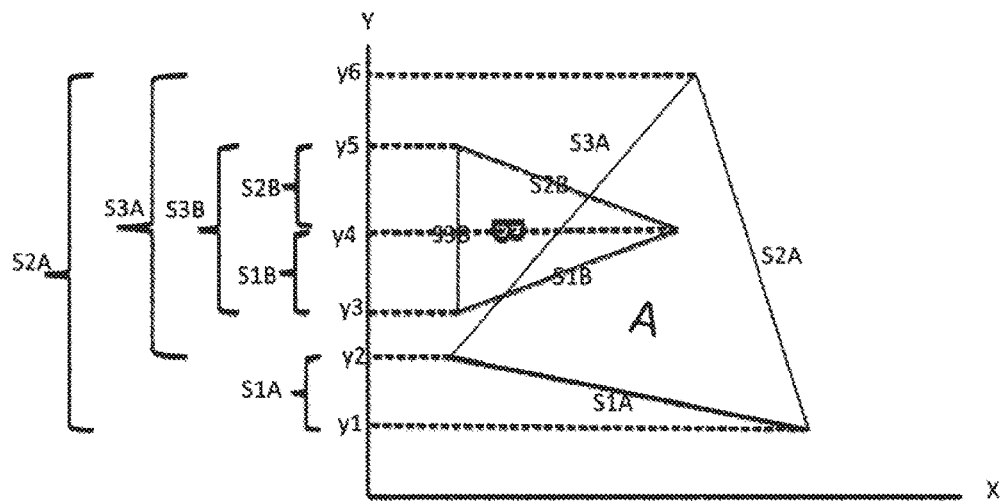
FIG. 11 illustrates segment projections with multiple polygons in accordance with the disclosed embodiments.

We can extend the above-described methodology to multiple polygons by including the identity of the polygon in the segmentId field. For example, FIG. 11 illustrates the case in which multiple polygons are projected onto the y-axis. Polygon A has segments with identity S1A, S2A, and S3A, and Polygon B has segments S1B, S2B, and S3B. Applying the above-described technique to the polygons shown in FIG. 10 yields the result that is displayed in Table 5. A comparison of Table 3 and Table 5 shows that, as one would expect, as more polygons are present, the set of ray intersections becomes larger for a given range.

We now describe a technique for minimizing the storage of ray intersection lists because the lists themselves can grow large and tend to be duplicative with respect to their neighboring lists. This is accomplished by storing 1 of every K ray intersection lists, and using the point data structure to update a stored intersection list at runtime. That is, the intersection list is stored modulo K. In this variation, the point data structure must be stored for each point and is used at runtime to update a stored ray intersection set to the desired g-range. For example, Table 6 below illustrates polygons of FIG. 11 stored with K=3 (modulo 3). Note how only one of every three intersection sets is not struck out, and also note that no point structures are struck out. The modulo parameter K provides a practical tradeoff between space in the index and the runtime cost of updating a stored ray to the desired y-range. In practice, a K value as large as 1024 can be used. For very large K values the storage space required for the index is approximately the same as for the polygons themselves.

We now describe the process of determining the set of intersected segments of a horizontal ray at an arbitrary height, given the modulo style of index storage. Given a desired ray height of Y, the sorted point structure is binary searched to determine the point having a stored ray and a y-value less than or equal to the desired y-value. In essence, the system retrieves a ray that is parallel to, but lower than the desired ray. This lower ray is then raised to the desired height using the opening and closing technique. When a point is reached having a y-value greater than the desired height, the technique terminates.

TABLE 6

{S1A, --, y1, O}: [S1A]
{S2A, --, y1, O}: ~~[S1A, S2A]~~
{S3A, --, y2, O}: ~~[S1A, S2A, S3A]~~
{S1A, --, y2, C}: [S2A, S3A]
{S1B, --, y3, O}: ~~[S2A, S3A, S1B]~~
{S3B, --, y3, O}: ~~[S2A, S3A, S1B, S3B]~~

TABLE 6-continued

{S2B, --, y4, O}: [S2A, S3A, S1B, S3B, S2B]
{S1B, --, y4, C}: ~~[S2A, S3A, S3B, S2B]~~
{S2B, --, y5, C}: ~~[S2A, S3A, S3B]~~
{S3B, --, y5, C}: [S2A, S3A]
{S2A, --, y6, C}: ~~[S3A]~~
{S3A, --, y6, C}: ~~[ ]~~

For example, consider a point at location {x,y} for which we want to answer the PIP question. Assume Y falls in the range [y4, y5) of Table 6. Binary searching the point structure yields {S2B, —, y4, O}: [S2A, S3A, S1B, S3B, S2B] because the point structure and ray are lower than or equal to the desired y. Correcting the ray using the following point structure {S1B, —, y4, C} updates the ray to [S2A, S3A, S3B, S2B], which is the correct set of intersections for a ray falling in the range [y4, y5). The next point structure, {S2B, —, y5, C}, causes the updating to stop, because y5 is greater than the desired height.

Figure 12:
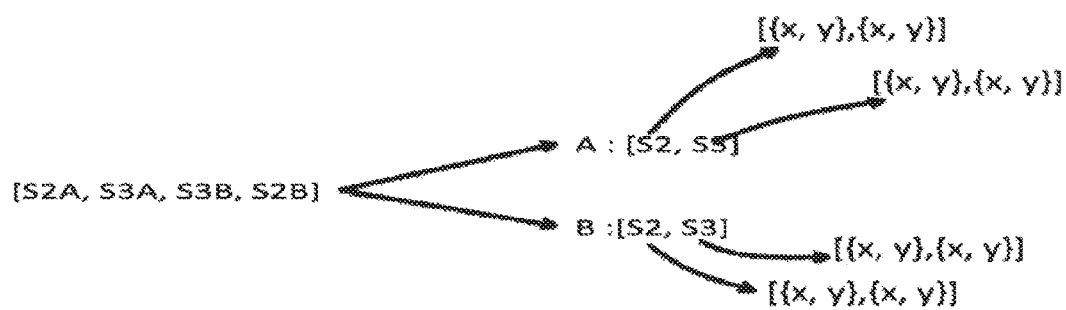
FIG. 12 illustrates a grouping of intersection sets by polygon identity in accordance with the disclosed embodiments.

The preceding disclosure describes how to retrieve a pre-cast ray from the index. Also, for the case of modulo indexing, we showed how to "correct" a stored ray to raise its height to the desired range. We now describe the step of how to apply the CN technique to the ray. The rays retrieved (and possibly corrected) from the index are cast from negative infinity toward positive infinity in the X direction. The intersection sets such as [S2A, S3A, S1B, S3B, S2B] are made of segment IDs that include the polygon identity (for instance "A" and "B"). Therefore, before feeding segments to the CN technique, we must first group them by polygonId. This is illustrated in FIG. 12. While we have heretofore described the elements of the intersection list as simple lists of segmentId values, we store both the opening and closing point of each segment in conjunction with the segmentId. The reason for this is that a ray cast from negative infinity to positive infinity effectively includes two ray tests (we can think of this as a ray originating at the point to test and emanating to positive infinity and the second ray originating at the point to test emanating to negative infinity). Because the CN test casts a single ray, we need the two points defining each line segment to determine which segments do not intersect the test ray, which we arbitrarily choose to be the one emanating to positive infinity.

Using the data illustrated in FIG. 12, the CN test first groups the segments by polygon. Then, for each set, the CN test counts segments that are intersected by the ray emanating to positive infinity. From this point, the output of the CN technique is of the standard known form: if the count is odd, the point in question was inside the given polygon. If the count is even, the point in question was outside the given polygon.

In the technique presented so far, a ray must be retrieved (and corrected as needed) for each point to be tested. In practice, retrieving the ray and correcting it takes substantially longer (by orders of magnitude) than performing the CN technique on the retrieved set. The fact that the intersection set is invariant for a given range [ymin, ymax) allows for amortization of the intersection set retrieval and correction costs when a batch of points needs to be PIP tested. This can be accomplished by first sorting the points to be batch tested based on their y-value. While processing the first point in the now-sorted batch, the corresponding ray can be retrieved and corrected from the index. For the second point, and all subsequent points to be tested, the ray can be incrementally corrected. That is to say, if the subsequent point to be tested still falls within the [ymin, ymax)

range of the corrected ray, then no further action is required, and the CN technique is again applied directly to the subsequent point. Subsequent points are processed until a point is encountered whose y-value surpasses the upper extent of the ray's valid range (ymax). At this point, rather than performing a brand new query for a ray (which would require a binary search), one can simply continue to apply correction to the ray which requires forward iteration in the index, but not binary searching.

Note that in addition to determining which points fall within each polygon, the above-described technique can be modified to determine whether a given shape overlaps, intersects or encloses another shape by performing the technique for the points that define the given shape.

Displaying Geographic Data

Figure 13:
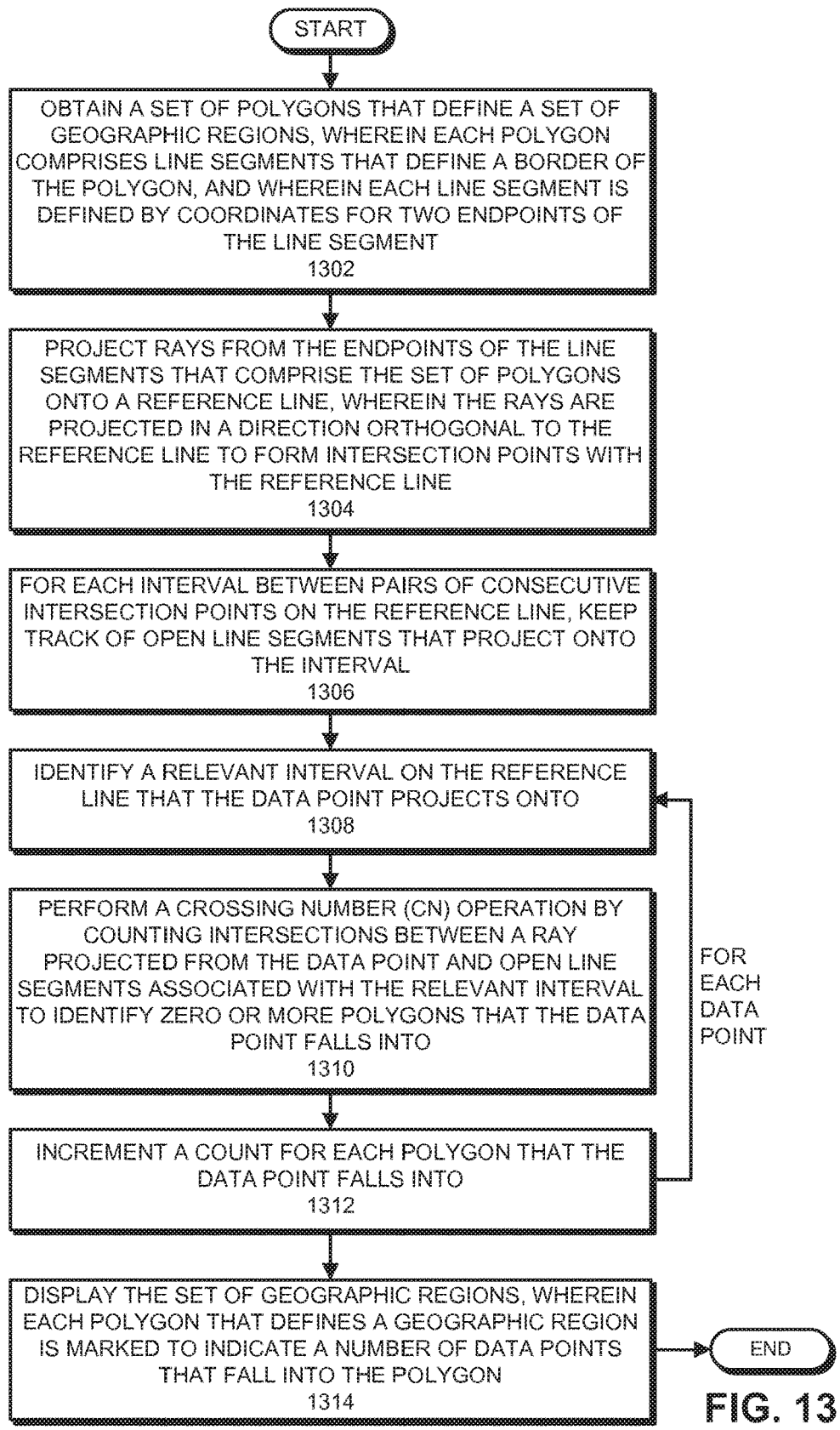
FIG. 13 presents a flow chart illustrating the process of displaying geographic data in accordance with the disclosed embodiments.

FIG. 13 presents a flow chart illustrating the process of displaying geographic data in accordance with the disclosed embodiments. At the start of the process, the system obtains a set of polygons that defines a set of geographic regions, wherein each polygon comprises line segments that define a border of the polygon, and wherein each line segment is defined by coordinates for two endpoints of the line segment (step 1302). Next, the system projects rays from the endpoints of the line segments that comprise the set of polygons onto a reference line, wherein the rays are projected in a direction orthogonal to the reference line to form intersection points with the reference line (step 1304). (In some embodiments, the reference line is the y-axis in a Cartesian coordinate system and the rays are projected horizontally parallel to the x-axis.) Then, for each interval between pairs of consecutive intersection points on the reference line, the system keeps track of open line segments that project onto the interval (step 1306).

Next, for each data point in a set of data points to be processed, the system identifies a relevant interval on the reference line that the data point projects onto (step 1308), and performs a crossing number (CN) operation by counting intersections between a ray projected from the data point and open line segments associated with the relevant interval to identify zero or more polygons that the data point falls into (step 1310). The intersections can be detected by performing an intersection test using an equation for the line segment (y=mx+b) to see whether a ray projected from positive infinity to the data point intersects the line segment. If the reference line is the y-axis, the system can perform a simple initial filtering test to see whether both x-coordinates of the line segment are less than the data point's x-coordinate. This enables the system to throw out line segments that are obviously not intersected by the ray. The system then increments a count for each polygon that the data point falls into (step 1312).

Finally, the system displays the set of geographic regions, wherein each polygon that defines a geographic region is marked to indicate a number of data points that fall into the polygon (step 1314).

Performing a Geofencing Operation

Figure 14:
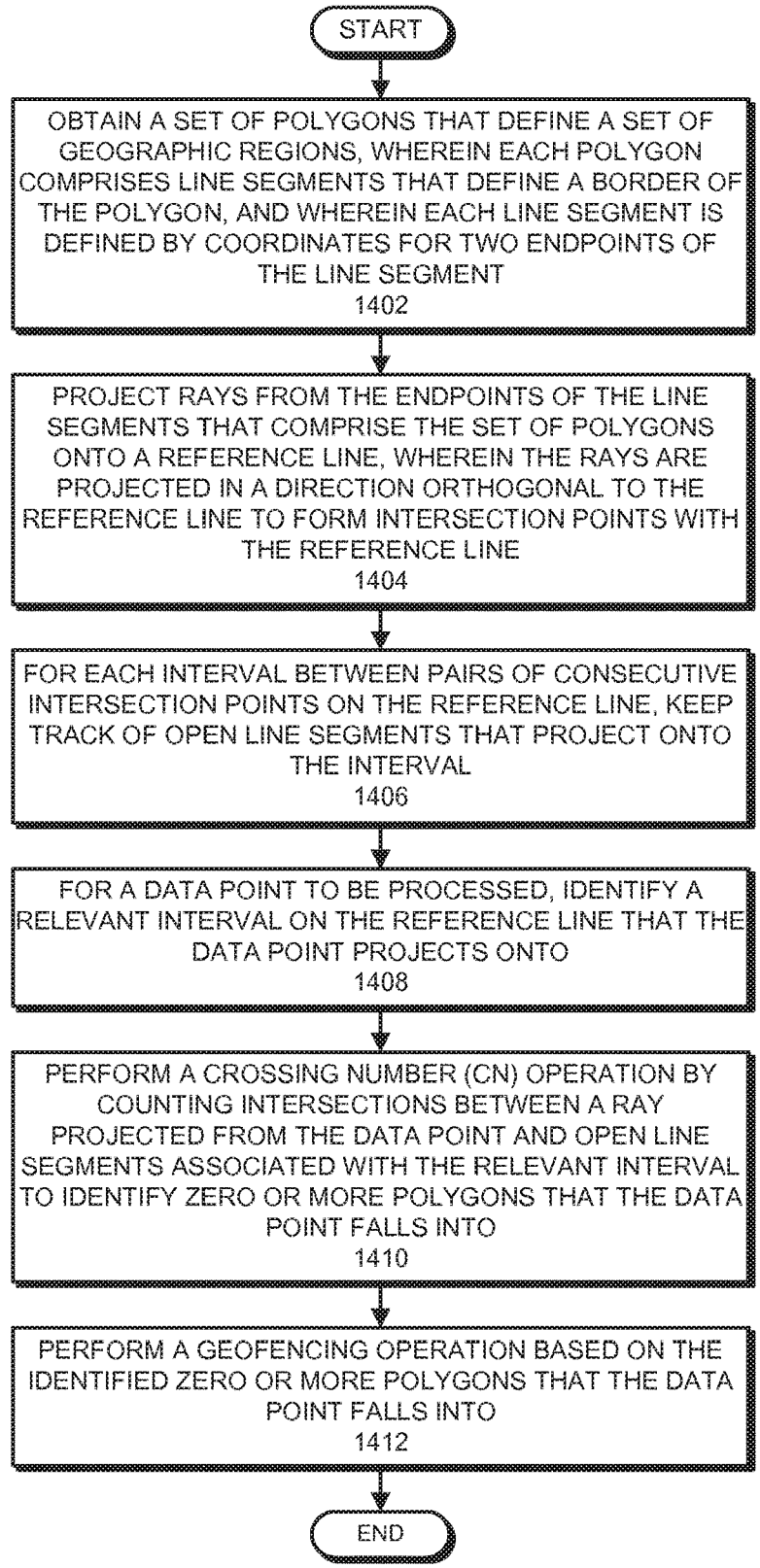
FIG. 14 presents a flow chart illustrating the process of performing a geofencing operation in accordance with the disclosed embodiments.

FIG. 14 is a flow chart illustrating the process of performing a geofencing operation in accordance with the disclosed embodiments. At the start of this process, the system obtains a set of polygons that defines a set of geographic regions, wherein each polygon comprises line segments that define a border of the polygon, and wherein each line segment is defined by coordinates for two endpoints of the line segment (step 1402). Next, the system projects rays from the endpoints of the line segments that comprise the set of polygons onto a reference line, wherein the rays are projected in a direction orthogonal to the reference line to form intersection points with the reference line (step 1404). Then, for each interval between pairs of consecutive intersection points on the reference line, the system keeps track of open line segments that project onto the interval (step 1406).

Next, for a data point to be processed, the system identifies a relevant interval on the reference line that the data point projects onto (step 1408). The system subsequently performs a crossing number (CN) operation by counting intersections between a ray projected from the data point and open line segments associated with the relevant interval to identify zero or more polygons that the data point falls into (step 1410). Finally, the system performs a geofencing operation based on the identified zero or more polygons that the data point falls into (step 1412). For example, the geofencing operation can involve sending a notification to a user when the user's location (obtained from the user's phone) indicates that the user has crossed a geofence boundary associated with a restricted security area.

Processing a Query Involving Geographic Information

Figure 15:
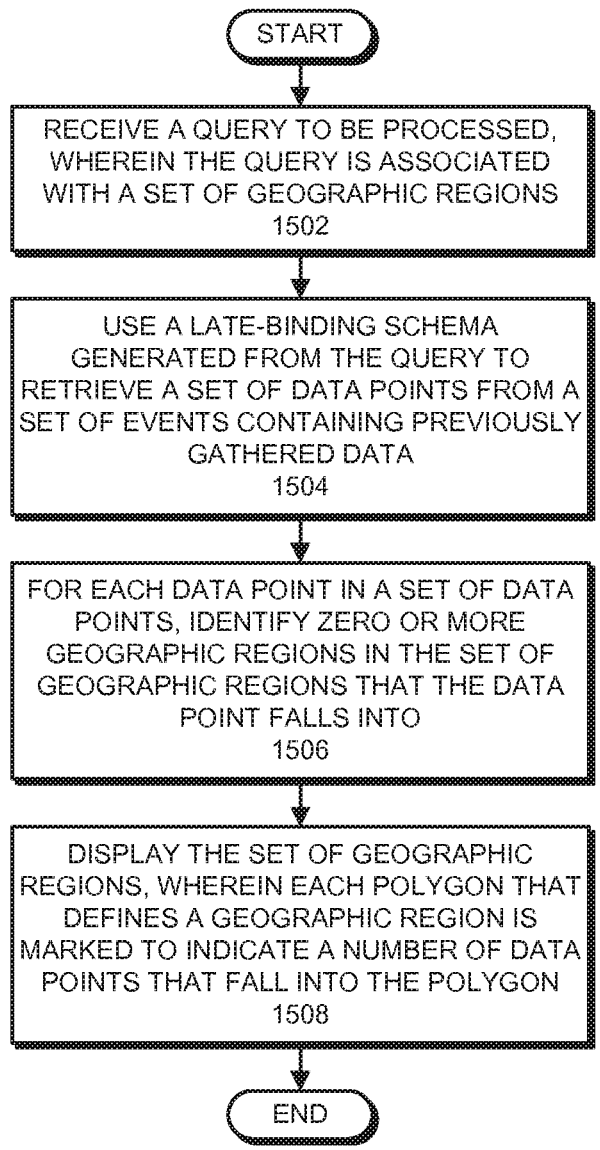
FIG. 15 presents a flow chart illustrating the processing of a query involving geographic data in accordance with the disclosed embodiments.

FIG. 15 is a flow chart illustrating the processing of a query involving geographic information in accordance with the disclosed embodiments. First, the system receives the query to be processed, wherein the query is associated with a set of geographic regions (step 1502). Next, the system uses a late-binding schema generated from the query to retrieve data points from a set of events containing previously gathered data (step 1504). For example, if the query asks to count the population in each state in the United States, the system can use a late-binding schema to retrieve residence locations for people in the United States from a set of event data.

Next, for each for each data point in a set of data points, the system identifies zero or more geographic regions in the set of geographic regions that the data point falls into (step 1506). Finally, the system displays the set of geographic regions, wherein each polygon that defines a geographic region is marked to indicate a number of data points that fall into the polygon (step 1508).

Polygon Clipping

A known polygon-clipping technique is the Greiner-Hormann technique (GH). The GH technique begins by finding all the points at which two polygons intersect. Given n vertices for the subject polygon and m vertices for the clip polygon, the step of finding the intersections is O(m*n). We will use the PIP index (described above), with a slight modification to reduce the complexity to worst case 4*log (n), thereby greatly improving performance (in comparison to a conventional GH technique) against a large server-side database of polygons.

Figure 16:
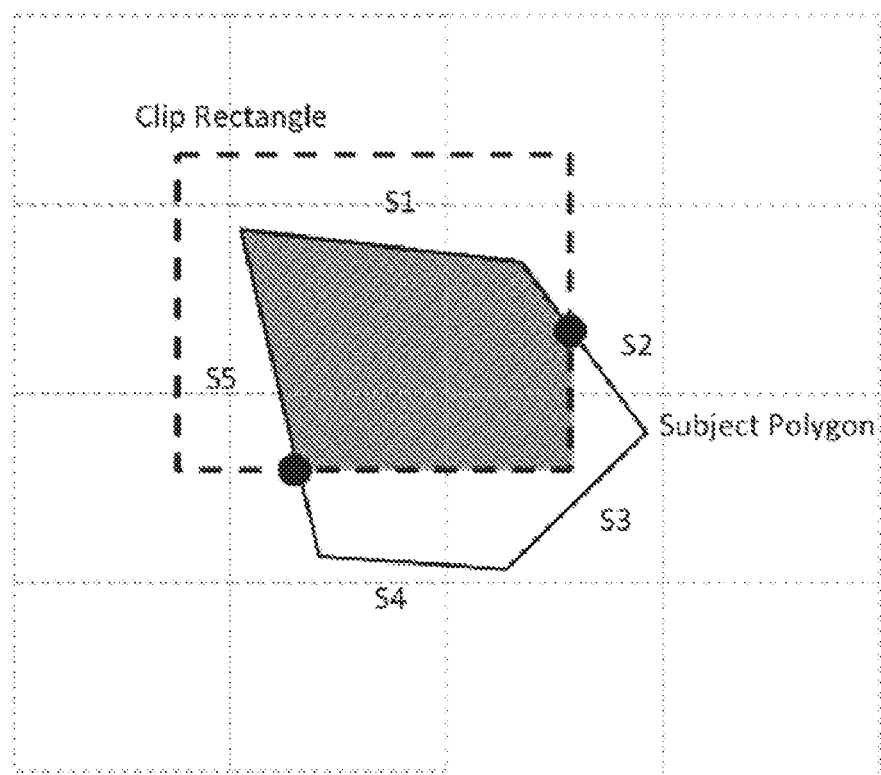
FIG. 16 illustrates a subject polygon and an isothetic clip rectangle in accordance with the disclosed embodiments.

Let us consider the special case of a clip polygon that is an isothetic rectangle (that is to say, a rectangle whose horizontal edges are parallel to the x-axis, and vertical edges are parallel to the y-axis). FIG. 16 shows an isothetic clip rectangle and a subject polygon superimposed on a storage grid. One point of intersection is found on a vertical right edge of the clip rectangle; and the other intersection is found on the horizontal bottom edge of the clip rectangle.

Figure 17:
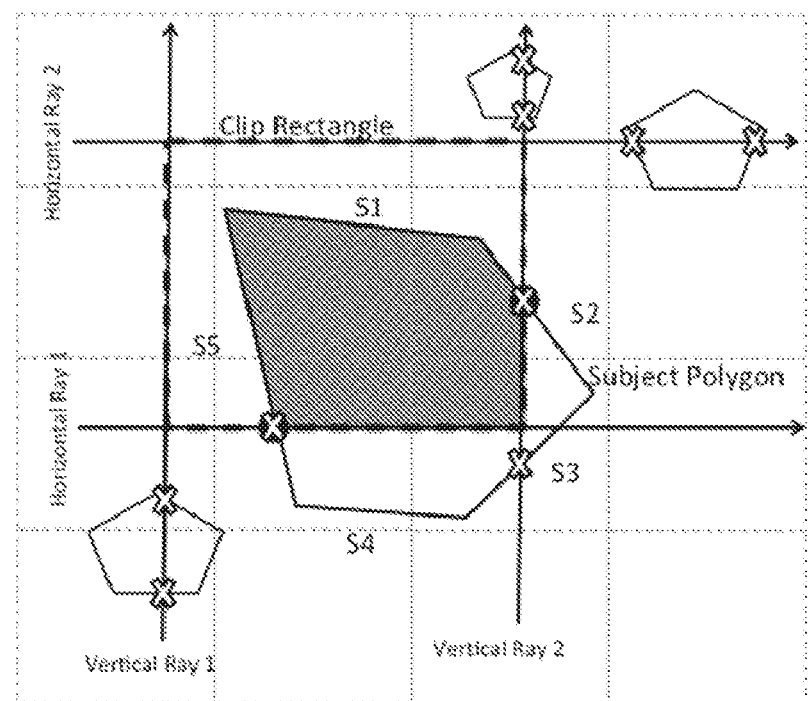
FIG. 17 illustrates edges of a clip rectangle and co-linear rays in accordance with the disclosed embodiments.

FIG. 17 depicts horizontal and vertical rays co-linear with the 4 edges of the clip rectangle. The co-linear rays are labeled Horizontal Ray 1, Horizontal Ray 2, Vertical Ray 1, and Vertical Ray 2. Each ray has an associated set of segments that are intersected by the ray (labeled with an 'X'). We have already shown for horizontal rays how to store and retrieve such rays and their intersections using the PIP index. Limiting the intersections to the edges of the clip rectangle is a simple matter of ignoring any intersections that fall outside a desired range. For example, taking the ray labeled Vertical Ray 2, we find only one segment-intersection whose y coordinate falls between the inclusive bounds of Horizontal Ray 1 and Horizontal Ray 2. The other three intersections of Vertical Ray 2 can be ignored.

Figure 18:
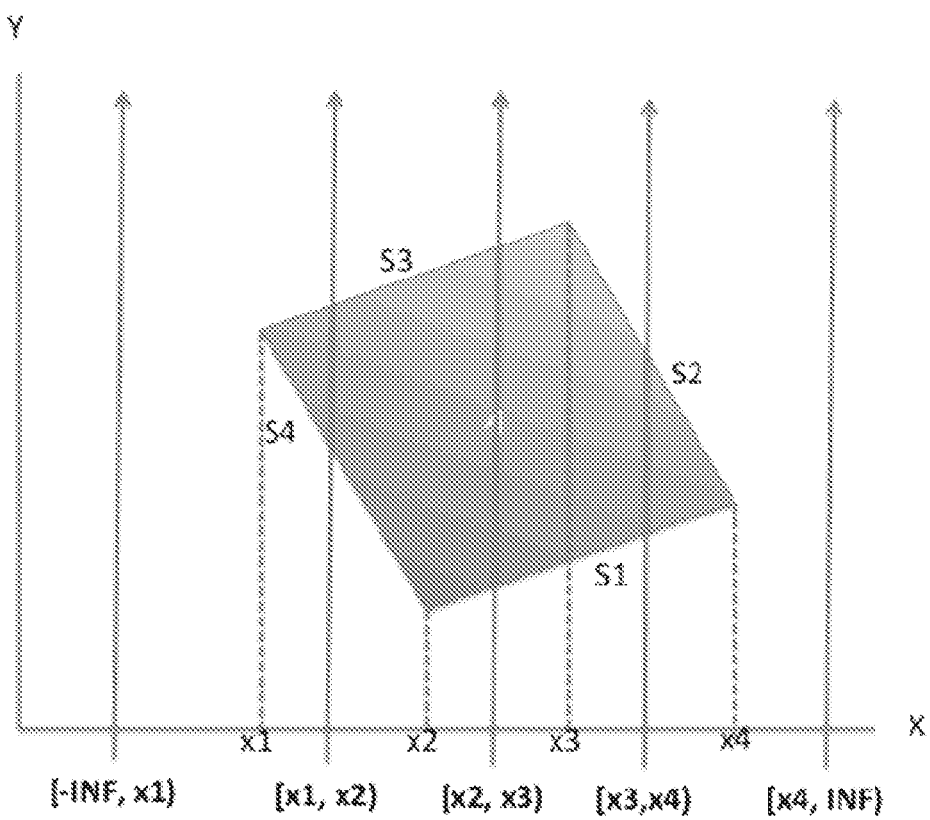
FIG. 18 illustrates an auxiliary point-in-polygon (PIP) index for vertical rays in accordance with the disclosed embodiments.

For the horizontal edges, this obviates the need to, for each segment of the clip, check each segment of the subject, thereby avoiding the m*n dominant term of the complexity of GH. However, we have no means to look up the vertical edges of the rectangle. We solve this problem by creating a second PIP index, but in the second PIP index, we project points onto the x-axis, thereby indexing vertical rays as opposed to horizontal rays. This is depicted in FIG. 18 for an arbitrary polygon set. At this point, we have solved part of the problem of the GH technique: as we can find all the intersections of the clip and subject polygon.

Figure 19:
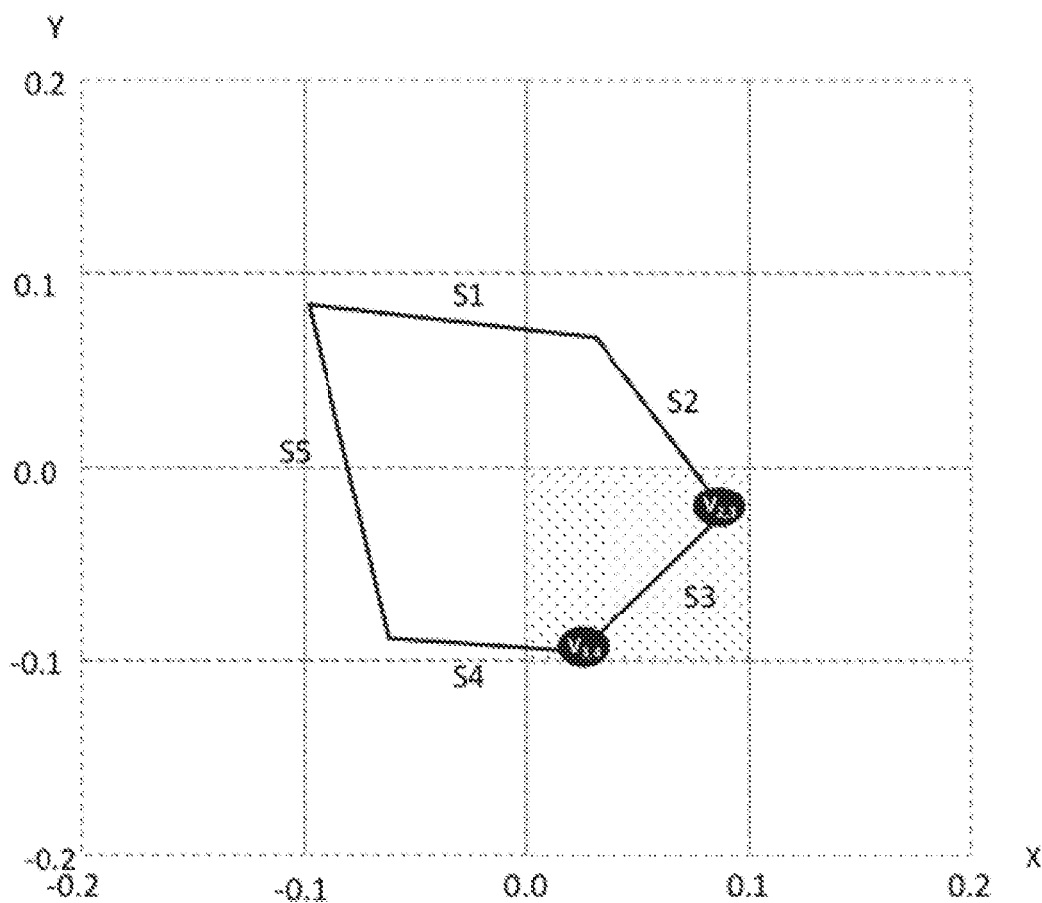
FIG. 19 illustrates tiled storage segments in accordance with the disclosed embodiments.

So far we have shown how to efficiently retrieve the intersections between a subject polygon and the clipping rectangle. We also need a means to retrieve and order all the segments of the polygons that fall within the clip rectangle. For instance, looking at FIG. 19, the shaded area of the subject polygon contains segment S1, a portion of S2, and a portion of S5. The segments of all polygons are stored in a tiled grid. FIG. 19 illustrates the storage grid, where increments of ⅒ of a unit are used as the grid size.

Individual keys are indexed by their minimum coordinate in a (yMin, xMin) tuple. In other words, the minimum (lower left) corner of any tile is used to identify the tile. For instance examining the shaded tile of FIG. 10, the key for the tile is (−0.1, 0.0). Any vertex falling inside a tile results in the assignment of two segments to the tile: the segment "entering" the vertex, and the segment "exiting" the vertex. This implies that each segment is stored twice: once for the vertex it exits, at its tail and once for the vertex it enters at its tip (though these need not be in the same tile since a segment can span tiles).

FIG. 19 highlights two vertices a labeled "$V_{2,3}$" and "$V_{3,4}$". The meaning of the subscript is to give the segments IDs of segments entering and exiting the given vertex. Considering "$V_{2,3}$", the given vertex results in both segments S2 and S3 being logically stored in the tile identified by its minimum corner (−0.1, 0.0). The other vertex in the shaded tile, $V_{3,4}$ results in S3 and S4 also being logically stored in the shaded tile.

Given a clip rectangle and a grid size (for instance tenths of a unit), the key for every tile within the clip rectangle or intersecting its boundary is trivial to calculate. One approach to retrieving the necessary segments is to seek and retrieve the content of each tile using the tile as a key in a key-value database.

In the following technique we use a structure called subject_and_clip that pairs a copy of the clipping rectangle with a particular subject polygon. We refer to a subject_and_clip for a particular polygon id as subject_and_clip(id). Think of subject_and_clip as a global hashmap where the key is a poygonId and the value is SubjectAndClip object. If we attempt to retrieve subject_and_clip(14), for example, and no SubjectAndClip object is present in the map, then a new SubjectAndClip is created, inserted into the map with key 14, and the said SubjectAndClip's clip rectangle is initialized with its 4 corner vertices. The Subject_and_clip has methods by which points or intersections can be added to it, and for implementing the GH technique.

We implement the clipping technique as follows (virtually all of it constitutes precursor steps leading up to the final application of the GH technique to pairs of subject and clip rectangle):

```
For each EDGE of CLIP rectangle
    Retrieve INTERSECTIONs from PIP index
        for each INTERSECTION
            if INTERSECTION between EDGE endpoints
                perturb INTERSECTION
                id = polygonId of INTERSECTION's SEGMENT
                Add intersection to subject_and_clip(id)
            else discard INTERSECTION
For each TILE covered by CLIP
    for each SEGMENT in TILE
        POINT = SEGMENT's tail vertex
        id = polygonId of POINT
        add POINT to subject_and_clip(id)
For each POLYGON surrounding CLIPs centerpoint
    id = polygonId of POLYGON
    no-op on subject_and_clip(id)
For each subject_and_clip
    Sort subject Boundary's POINTs and INTERSECTIONS
    Sort clip Boundary's POINTs and INTERSECTIONS
    Apply GH technique and emit clipped subject
```

Now we proceed to examine details of the technique above. The "perturb INTERSECTION" step performs as specified by the GH technique: If the intersection between subject and clip is due to a vertex of one polygon falling exactly on the edge of another polygon, then the perturb method will move the computed intersection by the minimum value of a float, in both the x and y direction.

Figure 20:
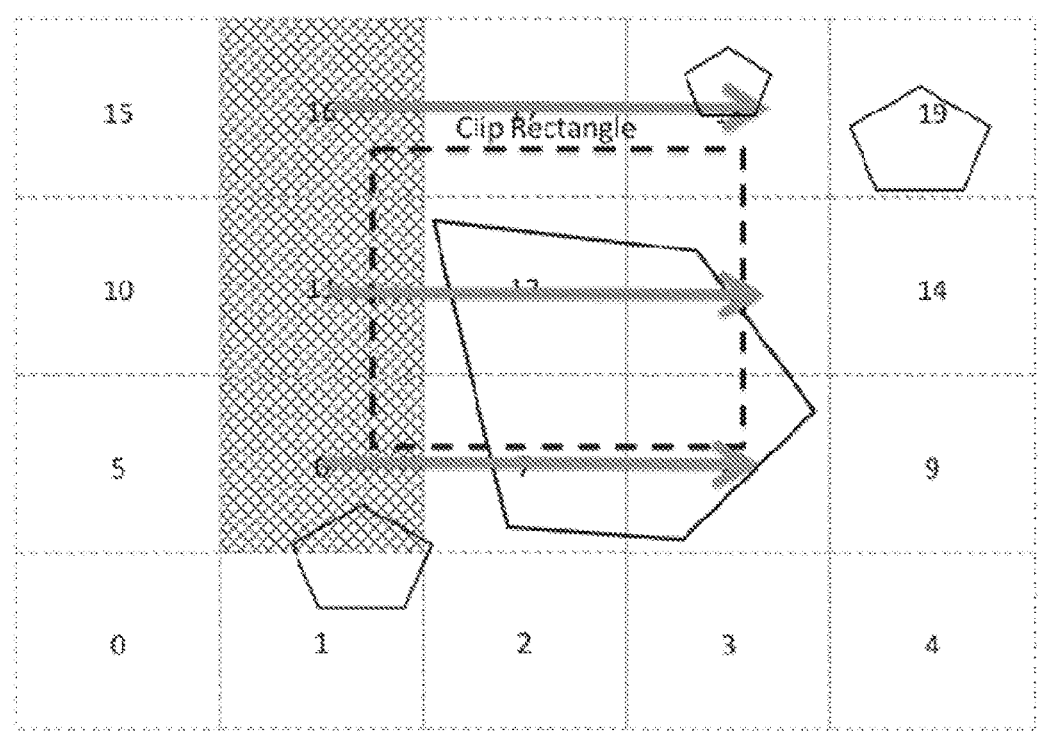
FIG. 20 illustrates retrieving tiles through horizontal row scanning in accordance with the disclosed embodiments.

The "for each TILE covered by CLIP" step retrieves the line segments of the subjects that fall in, or partially in, the clip rectangle. Retrieving these segments from tiles allows us to ignore the many segments of the subjects that fall outside of the clip rectangle. In FIG. 20, we show three shaded tiles corresponding to the left vertical edge of the Clip Rectangle. By organizing the tiles storage in the order shown (in this example, from 0 to 19), it is necessary only to seek to the position of the shaded tiles, then to scan forward as shown by the direction of the arrow, in keeping with the sequential order of storage. Each forward scan terminates when it reaches a tile intersecting the right edge of the bounding box. Many other storage arrangements are possible, using space filling curves such as a Z-curve and Hilbert Curve. As shown, the number of seeks is reduced from nine (one for each tile covered by the bounding box) to three.

With step For each POLYGON surrounding CLIPs centerpoint we account for polygons that totally surround the clip rectangle and have no intersections with it. Such polygons would otherwise appear invisible to the technique due to the fact that they would appear neither in tiles intersecting or contained by the clip nor have any intersections with the clip and such would never be seen by any steps of the technique. Such polygons should be emitted(?) as shapes exactly matching that of the clip (imagine zooming deep inside a given polygon; the edges of the polygon disappear as we zoom in but the rectangular viewport should remain completely filled with the interior color of the polygon). To accomplish this, we simply use the PIP index to lookup all polygonIds, "id" surrounding the center point of the clip rectangle and perform a no-op on subject_and_clip(id) for each id. The meaning of the no-op is for a heretofore non-existent SubjectAndClip in the hashmap, create a new one, whose subject has no vertices, and whose clip is initialized to the four vertices of the clip rectangle. The no-op has the effect of "prodding" the global hashmap to insure that a SubjectAndClip is present even for subjects having no intersection with the clip rectangle, and no vertices falling inside the clip rectangle. For heretofore-existent SubjectAndClip instances, the no-op has no effect.

The step "For each subject_and_clip" indicates that each subject_and_clip consists of two Boundary objects, one for the subject and one for the clip. Once the subject_and_clip pair has been loaded with all its intersections and points, the Boundary objects of the subject and clip will sort their list of intersections into their points in accordance with GH. To do this, the intersections are sorted first by their subject segmentID (i.e., sorted first by the identity of the line segment upon which the intersection falls) and second by their alpha value (distance between the tail of the segment on which the intersection falls and the intersection itself). Since the clip rectangle is artificial (it doesn't exist in the index) its segments (edges) are assigned artificial segmentIds at the time the Boundary is initialized for the clip rectangle. The clip's segment Ids are assigned in increasing order beginning with the north edge and proceeding clockwise. In this manner a standard Boundary object can sort intersections into a clip rectangle's vertices as well as into a polygon whose vertices connect "real" segmentIds in the index. Finally, the GH technique is applied to each SubjectAndClip in the global subject_and_clip map, thereby emitting every polygon clipped by the clip rectangle.

Flow Charts

Figure 21:
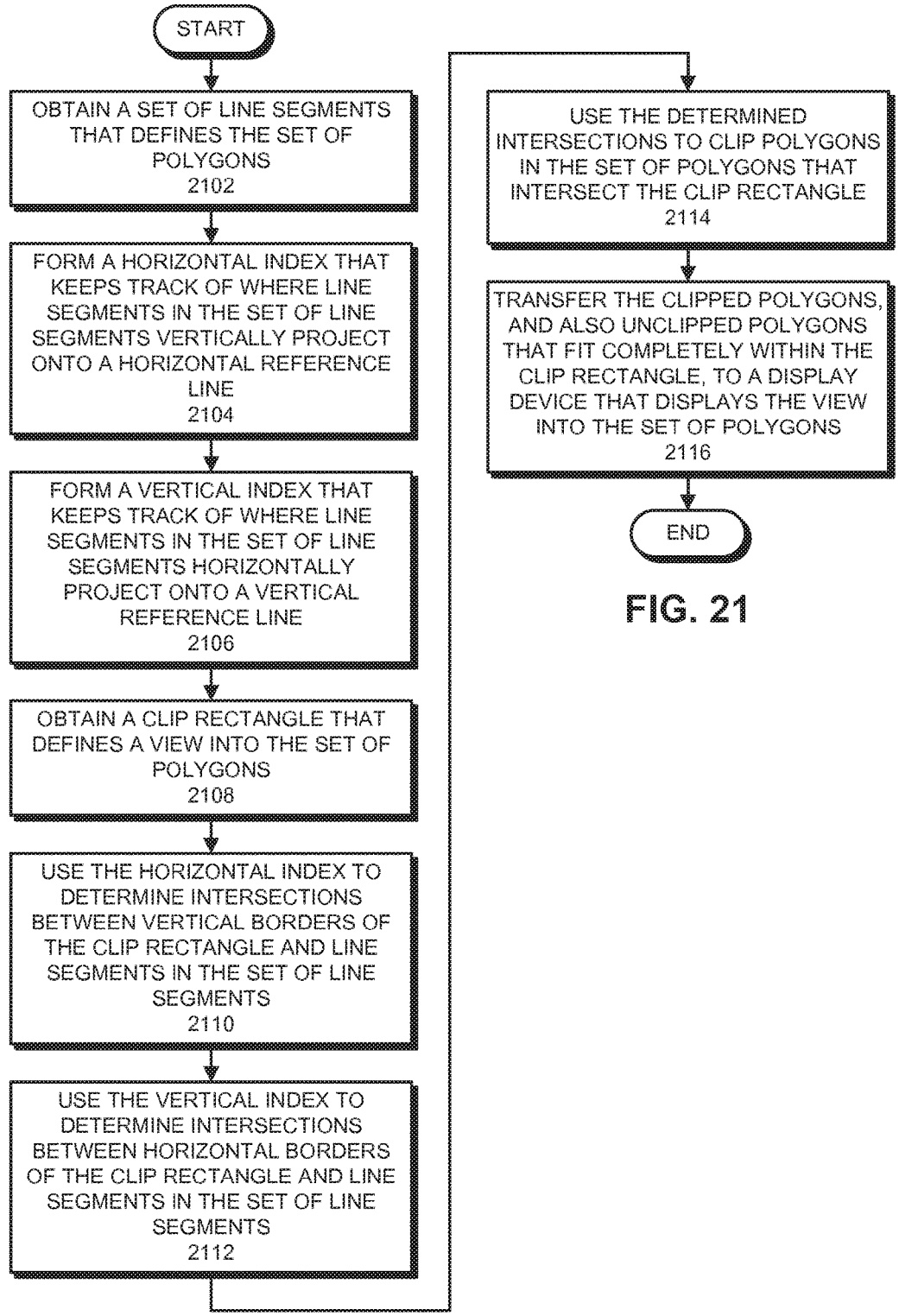
FIG. 21 presents a flow chart illustrating the process of displaying a view into a set of polygons in accordance with the disclosed embodiments.

FIG. 21 is a flow chart illustrating the process of displaying a view into a set of polygons in accordance with the disclosed embodiments. During operation, the system obtains a set of line segments that defines the set of polygons (step 2102). Next, the system forms a horizontal index (see FIG. 18) that keeps track of where line segments in the set of line segments vertically project onto a horizontal reference line (step 2104). The system also forms a vertical index that keeps track of where line segments in the set of line segments horizontally project onto a vertical reference line (step 2106). The system then obtains a clip rectangle that defines a view into the set of polygons step 2108). Next, the system uses the horizontal index to determine intersections between vertical borders of the clip rectangle and line segments in the set of line segments (step 2110) and also uses the vertical index to determine intersections between horizontal borders of the clip rectangle and line segments in the set of line segments (step 2112). Next, the system uses the determined intersections to clip polygons in the set of polygons that intersect the clip rectangle (step 2114). Finally, the system transfers the clipped polygons, and also unclipped polygons that fit completely within the clip rectangle, to a display device that displays the view into the set of polygons (step 2116).

FIG. 22 is a flow chart illustrating the process of displaying a view for a new clip rectangle in accordance with the disclosed embodiments. First, the system obtains a new clip rectangle from a user that defines a new view into the set of polygons (step 2202). The system then uses the horizontal index to determine intersections between vertical borders of the new clip rectangle and line segments in the set of line segments (step 2204), and also uses the vertical index to determine new intersections between horizontal borders of the new clip rectangle and line segments in the set of line segments (step 2206). Next, the system uses the new intersections to clip polygons in the set of polygons that intersect the new clip rectangle (step 2208). Then, the system transfers the new clipped polygons, and also unclipped polygons that fit completely within the new clip rectangle, to a display device that displays the new view into the set of polygons (step 2210).

FIG. 23 is a flow chart illustrating how a tiled grid can be used to reduce the number of segments that need to be analyzed in accordance with the disclosed embodiments. During operation, the system maintains a storage grid to keep track of the set of line segments with respect to a tiled grid, wherein the tiled grid divides a region occupied by the set of polygons into a set of tiles and wherein each entry in the storage grid identifies line segments with endpoints that fall within a corresponding tile in the tiled grid (step 2302). Then, prior to determining the intersections using the horizontal and vertical indexes, the system winnows the set of line segments by identifying tiles in the set of tiles that intersect with or are contained within the clip rectangle (step 2304), looking up the identified tiles in the storage grid to identify line segments having endpoints that fall within the identified tiles (step 2306), and redefining the set of line segments to comprise the identified line segments (step 2308).

Figure 24:
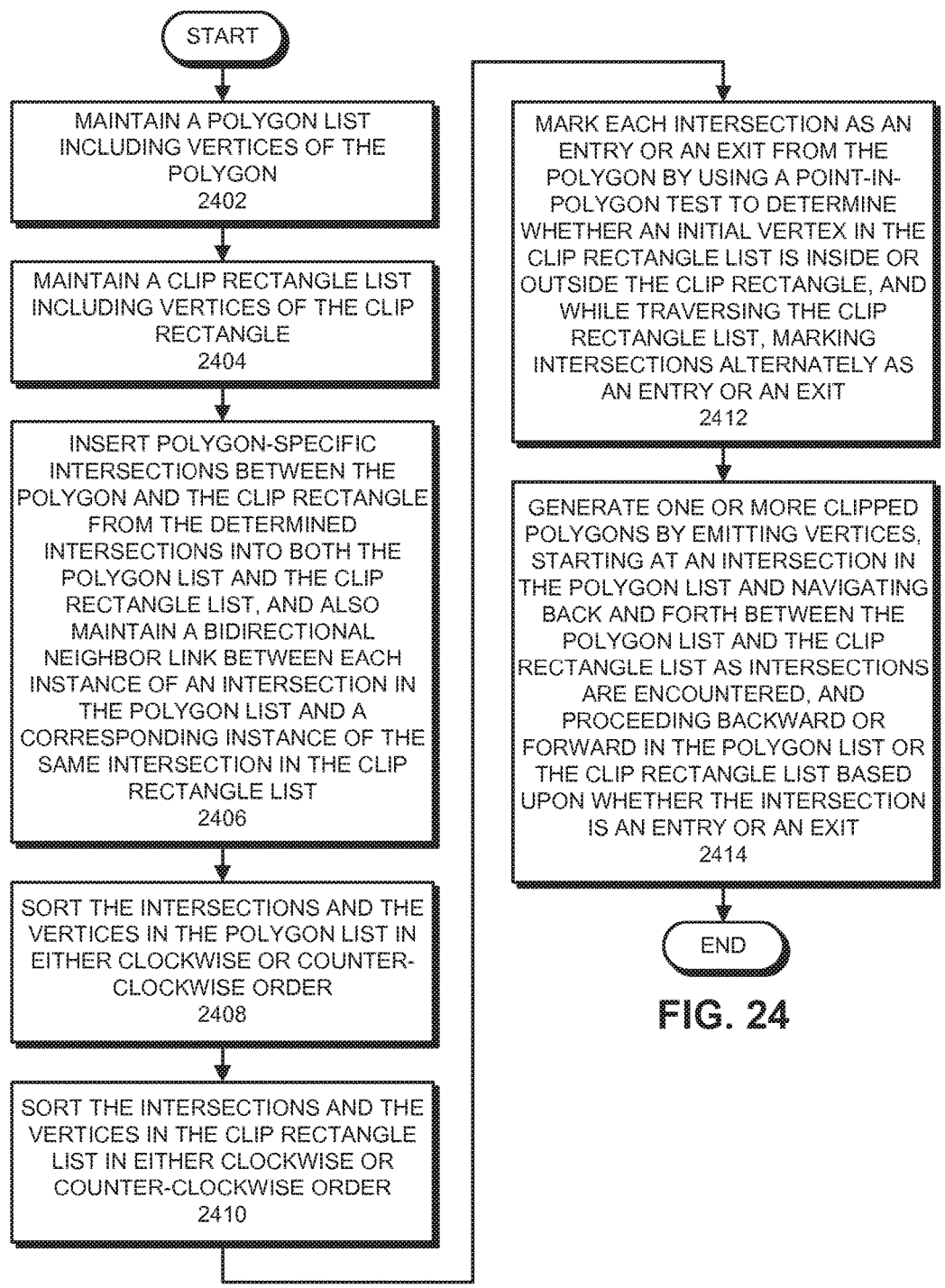
FIG. 24 presents a flow chart illustrating the process of clipping polygons in accordance with the disclosed embodiments.

FIG. 24 is a flow chart illustrating the process of clipping polygons in accordance with the disclosed embodiments. During operation, the system uses the determined intersections to clip the polygons by performing the following operations. For each polygon in a set of polygons intersected by the clip rectangle, the system maintains a polygon list including vertices of the polygon (step 2402) and also maintains a clip rectangle list including vertices of the clip rectangle (step 2404). Next, the system inserts polygon-specific intersections between the polygon and the clip rectangle, obtained from the determined intersections, into both the polygon list and the clip rectangle list and also maintains a bidirectional neighbor link between each instance of an intersection in the polygon list and a corresponding instance of the same intersection in the clip rectangle list (step 2406). Then, the system sorts the intersections and the vertices in the polygon list in either clockwise or counter-clockwise order (step 2408) and also sorts the intersections and the vertices in the clip rectangle list in either clockwise or counter-clockwise order (step 2410). The system then marks each intersection as an entry or an exit from the polygon by using a point-in-polygon test to determine whether an initial vertex in the clip rectangle list is inside or outside the clip rectangle and, while traversing the clip rectangle list, marks intersections alternately as an entry or an exit (step 2412). Finally, the system generates one or more clipped polygons by emitting vertices starting at an intersection in the polygon list and navigating back and forth between the polygon list and the clip rectangle list as intersections are encountered, proceeding backward or forward in the polygon list or the clip rectangle list based upon whether the intersection is an entry or an exit (step 2414).

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The invention claimed is:

1. A computer-implemented method for displaying a set of polygons, comprising:
    obtaining a clip region that defines a view into the set of polygons, wherein the set of polygons is defined by a set of line segments;
    using a PIP index to determine intersections between borders of the clip region and line segments in the set of line segments;
    looking up tiles of a storage grid that intersect with the clip region to identify endpoints of line segments in the set of line segments for which the endpoints fall within the tiles;
    using the determined intersections and the identified endpoints to clip polygons in the set of polygons that intersect the clip region to form clipped polygons that fit within the clip region; and
    providing the clipped polygons to a device for a presentation of the view into the set of polygons.

2. The computer-implemented method of claim 1, wherein prior to obtaining the clip region, the method further comprises:
    obtaining the set of line segments that defines the set of polygons;
    forming a horizontal PIP index, wherein the horizontal PIP index keeps track of where line segments in the set of line segments vertically project onto a horizontal reference line; and
    forming a vertical PIP index, wherein the vertical PIP index keeps track of where line segments in the set of line segments horizontally project onto a vertical reference line.

3. The computer-implemented method of claim 2, wherein forming the horizontal PIP index comprises:
    projecting rays vertically from endpoints of line segments in the set of line segments onto the horizontal reference line to form intersections with the horizontal reference line; and
    for each interval between consecutive intersections on the horizontal reference line, keeping track of open line segments that project onto the interval.

4. The computer-implemented method of claim 2, wherein forming the vertical PIP index comprises:
    projecting rays horizontally from endpoints of line segments in the set of line segments onto the vertical reference line to form intersections with the vertical reference line; and
    for each interval between consecutive intersections on the vertical reference line, keeping track of open line segments that project onto the interval.

5. The computer-implemented method of claim 1, wherein the method further comprises:
    obtaining a new clip region from a user that defines a new view into the set of polygons;
    using the PIP index to determine intersections between borders of the new clip region and line segments in the set of line segments;
    using the new intersections to clip polygons in the set of polygons that intersect the new clip region; and
    providing the new clipped polygons to the device for a presentation of the new view into the set of polygons.

6. The computer-implemented method of claim 1, wherein the method further comprises:
    maintaining the storage grid to keep track of the set of line segments with respect to a tiled grid, wherein the tiled grid divides a region occupied by the set of polygons into a set of tiles and wherein each entry in the storage grid identifies line segments with endpoints that fall within a corresponding tile in the tiled grid; and
    wherein prior to determining the intersections using the PIP index, the method further comprises winnowing the set of line segments by:
    identifying tiles in the set of tiles that intersect with or are contained within the clip region,
    looking up the identified tiles in the storage grid to identify line segments having endpoints that fall within the identified tiles, and
    redefining the set of line segments to comprise the identified line segments.

7. The computer-implemented method of claim 1, wherein while using the determined intersections to clip the polygons, the method comprises, for each polygon in a set of polygons intersected by the clip region:
    maintaining a polygon list including vertices of the polygon;
    maintaining a clip region list including vertices of the clip region;
    inserting polygon-specific intersections between the polygon and the clip region that are obtained from the determined intersections into both the polygon list and the clip region list and maintaining a bidirectional neighbor link between each instance of an intersection in the polygon list and a corresponding instance of the same intersection in the clip region list;
    sorting the intersections and the vertices in the polygon list in either clockwise or counter-clockwise order;
    sorting the intersections and the vertices in the clip region list in either clockwise or counter-clockwise order;

marking each intersection as an entry or an exit from the polygon by using a point-in-polygon test to determine whether an initial vertex in the clip region list is inside or outside the clip region, and while traversing the clip region list, marking intersections alternately as an entry or an exit; and generating one or more clipped polygons by emitting vertices starting at an intersection in the polygon list and navigating back and forth between the polygon list and the clip region list as intersections are encountered and proceeding backward or forward in the polygon list or the clip region list based upon whether the intersection is an entry or an exit.

8. The computer-implemented method of claim 1, wherein the set of polygons defines regions of a choropleth map wherein each region is shaded, patterned or colored in proportion to a number of data points that fall into the region.

9. The computer-implemented method of claim 1, wherein the method further comprises:
obtaining data associated with the set of polygons from a set of events containing raw data associated with a time stamp; and
providing the associated data to the device to facilitate displaying the set of polygons.

10. The computer-implemented method of claim 1, wherein the method further comprises:
receiving a query to be processed;
using a data-retrieval specification generated from the query to obtain data associated with the set of polygons from a set of events containing raw data associated with a time stamp; and
providing the associated data to the device to facilitate displaying the set of polygons.

11. A non-transitory computer-readable storage medium storing instructions that when executed by a computer cause the computer to perform a method for displaying a set of polygons, the method comprising:
obtaining a clip region that defines a view into the set of polygons, wherein the set of polygons is defined by a set of line segments;
using a PIP index to determine intersections between borders of the clip region and line segments in the set of line segments;
looking up tiles of a storage grid that intersect with the clip region to identify endpoints of line segments in the set of line segments for which the endpoints fall within the tiles;
using the determined intersections and the identified endpoints to clip polygons in the set of polygons that intersect the clip region to form clipped polygons that fit within the clip region; and
providing the clipped polygons to a device for a presentation of the view into the set of polygons.

12. The non-transitory computer-readable storage medium of claim 11, wherein prior to obtaining the clip region, the method further comprises:
obtaining the set of line segments that defines the set of polygons;
forming a horizontal PIP index, wherein the horizontal PIP index keeps track of where line segments in the set of line segments vertically project onto a horizontal reference line; and
forming a vertical PIP index, wherein the vertical PIP index keeps track of where line segments in the set of line segments horizontally project onto a vertical reference line.

13. The non-transitory computer-readable storage medium of claim 12, wherein forming the horizontal PIP index comprises:
projecting rays vertically from endpoints of line segments in the set of line segments onto the horizontal reference line to form intersections with the horizontal reference line; and
for each interval between consecutive intersections on the horizontal reference line, keeping track of open line segments that project onto the interval.

14. The non-transitory computer-readable storage medium of claim 12, wherein forming the vertical PIP index comprises:
projecting rays horizontally from endpoints of line segments in the set of line segments onto the vertical reference line to form intersections with the vertical reference line; and
for each interval between consecutive intersections on the vertical reference line, keeping track of open line segments that project onto the interval.

15. The non-transitory computer-readable storage medium of claim 11, wherein the method further comprises:
obtaining a new clip region from a user that defines a new view into the set of polygons;
using the PIP index to determine intersections between borders of the new clip region and line segments in the set of line segments;
using the new intersections to clip polygons in the set of polygons that intersect the new clip region; and
providing the new clipped polygons to the device for a presentation of the new view into the set of polygons.

16. The non-transitory computer-readable storage medium of claim 11, wherein the method further comprises:
maintaining the storage grid to keep track of the set of line segments with respect to a tiled grid, wherein the tiled grid divides a region occupied by the set of polygons into a set of tiles, and wherein each entry in the storage grid identifies line segments with endpoints that fall within a corresponding tile in the tiled grid; and
wherein prior to determining the intersections using the PIP index, the method further comprises winnowing the set of line segments by:
identifying tiles in the set of tiles that intersect with or are contained within the clip region;
looking up the identified tiles in the storage grid to identify line segments having endpoints that fall within the identified tiles; and
redefining the set of line segments to comprise the identified line segments.

17. The non-transitory computer-readable storage medium of claim 11, wherein while using the determined intersections to clip the polygons, the method comprises for each polygon in a set of polygons intersected by the clip region:
maintaining a polygon list including vertices of the polygon;
maintaining a clip region list including vertices of the clip region;
inserting polygon-specific intersections between the polygon and the clip region, obtained from the determined intersections, into both the polygon list and the clip region list and maintaining a bidirectional neighbor link between each instance of an intersection in the polygon list and a corresponding instance of the same intersection in the clip region list;
sorting the intersections and the vertices in the polygon list in either clockwise or counter-clockwise order;

sorting the intersections and the vertices in the clip region list in either clockwise or counter-clockwise order;

marking each intersection as an entry or an exit from the polygon by using a point-in-polygon test to determine whether an initial vertex in the clip region list is inside or outside the clip region, and while traversing the clip region list, marking intersections alternately as an entry or an exit; and generating one or more clipped polygons by emitting vertices starting at an intersection in the polygon list and navigating back and forth between the polygon list and the clip region list as intersections are encountered and proceeding backward or forward in the polygon list or the clip region list based upon whether the intersection is an entry or an exit.

18. The non-transitory computer-readable storage medium of claim 11, wherein the set of polygons defines regions of a choropleth map wherein each region is shaded, patterned or colored in proportion to a number of data points that fall into the region.

19. The non-transitory computer-readable storage medium of claim 11, wherein the method further comprises:
obtaining data associated with the set of polygons from a set of timestamped events containing raw data; and
providing the associated data to the device to facilitate displaying the set of polygons.

20. The non-transitory computer-readable storage medium of claim 11, wherein the method further comprises:
receiving a query to be processed;
using a data-retrieval specification generated from the query to obtain data associated with the set of polygons from a set of events containing raw data associated with a time stamp; and
providing the associated data to the device to facilitate displaying the set of polygons.

21. A system that displays a set of polygons, comprising:
at least one processor and at least one associated memory; and
a display mechanism that executes on the at least one processor, wherein during operation, the display mechanism:
obtains a clip region that defines a view into the set of polygons, wherein the set of polygons is defined by a set of line segments;
uses a PIP index to determine intersections between borders of the clip region and line segments in the set of line segments;
looks up tiles of a storage grid that intersect with the clip region to identify endpoints of line segments in the set of line segments for which the endpoints fall within the tiles;
uses the determined intersections and the identified endpoints to clip polygons in the set of polygons that intersect the clip region to form clipped polygons that fit within the clip region; and
provide the clipped polygons to a device for a presentation of the view into the set of polygons.

22. The system of claim 21, wherein prior to obtaining the clip region, the display mechanism:
obtains the set of line segments that defines the set of polygons;
forms a horizontal PIP index, wherein the horizontal PIP index keeps track of where line segments in the set of line segments vertically project onto a horizontal reference line; and
forms a vertical PIP index, wherein the vertical PIP index keeps track of where line segments in the set of line segments horizontally project onto a vertical reference line.

23. The system of claim 22, wherein while forming the horizontal PIP index, the display mechanism:
projects rays vertically from endpoints of line segments in the set of line segments onto the horizontal reference line to form intersections with the horizontal reference line; and
for each interval between consecutive intersections on the horizontal reference line, keeps track of open line segments that project onto the interval.

24. The system of claim 22, wherein while forming the vertical PIP index, the display mechanism:
projects rays horizontally from endpoints of line segments in the set of line segments onto the vertical reference line to form intersections with the vertical reference line; and
for each interval between consecutive intersections on the vertical reference line, keeps track of open line segments that project onto the interval.

25. The system of claim 21, wherein the display mechanism also:
obtains a new clip region from a user that defines a new view into the set of polygons;
uses the PIP index to determine intersections between borders of the new clip region and line segments in the set of line segments;
uses the new intersections to clip polygons in the set of polygons that intersect the new clip region; and
provides the new clipped polygons to the device for a presentation of the view into the set of polygons.

26. The system of claim 21, wherein the display mechanism: maintains the storage grid to keep track of the set of line segments with respect to a tiled grid, wherein the tiled grid divides a region occupied by the set of polygons into a set of tiles, and wherein each entry in the storage grid identifies line segments with endpoints that fall within a corresponding tile in the tiled grid; and
wherein prior to determining the intersections using the PIP index, the display mechanism winnows the set of line segments by:
identifying tiles in the set of tiles that intersect with or are contained within the clip region;
looking up the identified tiles in the storage grid to identify line segments having endpoints that fall within the identified tiles; and
redefining the set of line segments to comprise the identified line segments.

27. The system of claim 21, wherein while using the determined intersections to clip the polygons, the display mechanism does the following for each polygon in a set of polygons intersected by the clip region:
maintains a polygon list including vertices of the polygon;
maintains a clip region list including vertices of the clip region;
inserts polygon-specific intersections between the polygon and the clip region, obtained from the determined intersections, into both the polygon list and the clip region list, and maintains a bidirectional neighbor link between each instance of an intersection in the polygon list and a corresponding instance of the same intersection in the clip region list;
sorts the intersections and the vertices in the polygon list in either clockwise or counter-clockwise order;

sorts the intersections and the vertices in the clip region list in either clockwise or counter-clockwise order;

marks each intersection as an entry or an exit from the polygon by using a point-in-polygon test to determine whether an initial vertex in the clip region list is inside or outside the clip region, and while traversing the clip region list, marks intersections alternately as an entry or an exit; and generates one or more clipped polygons by emitting vertices starting at an intersection in the polygon list and navigating back and forth between the polygon list and the clip region list as intersections are encountered, and proceeding backward or forward in the polygon list or the clip region list based upon whether the intersection is an entry or an exit.

28. The system of claim 21, wherein the set of polygons defines regions of a choropleth map wherein each region is shaded, patterned or colored in proportion to a number of data points that fall into the region.

29. The system of claim 21, wherein the display mechanism additionally:

obtains data associated with the set of polygons from a set of events containing raw data associated with a time stamp; and provides the associated data to the device to facilitate displaying the set of polygons.

30. The system of claim 21, wherein the display mechanism additionally:

receives a query to be processed;

uses a data-retrieval specification generated from the query to obtain data associated with the set of polygons from a set of events containing raw data associated with a time stamp; and provides the associated data to the device to facilitate displaying the set of polygons.

\* \* \* \* \*